US012801658B2

(12) United States Patent
Slyman et al.

(10) Patent No.: US 12,801,658 B2
(45) Date of Patent: Nov. 17, 2026

(54) GENERATING AND MODIFYING DIGITAL IMAGE DATABASES THROUGH FAIRNESS DEDUPLICATION

(71) Applicant: Adobe Inc., San Jose, CA (US)

(72) Inventors: Eric Slyman, Camas, WA (US); Kushal Kafle, Boston, MA (US); Scott Cohen, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 238 days.

(21) Appl. No.: 18/639,568

(22) Filed: Apr. 18, 2024

(65) Prior Publication Data

US 2025/0329080 A1 Oct. 23, 2025

(51) Int. Cl.

| | |
|---|---|
| ***G06F 16/00*** | (2019.01) |
| ***G06F 16/50*** | (2019.01) |
| *G06T 11/60* | (2006.01) |
| *G06V 10/762* | (2022.01) |
| *G06V 10/82* | (2022.01) |

(52) U.S. Cl.

CPC .............. *G06F 16/50* (2019.01); *G06T 11/60* (2013.01); *G06V 10/762* (2022.01); *G06V 10/82* (2022.01)

(58) Field of Classification Search

CPC .......... G06F 16/40; G06F 16/41; G06F 16/43; G06F 16/45; G06F 16/50; G06F 16/56; G06T 11/60; G06V 10/762; G06V 10/82

USPC .................................................. 707/600–899

See application file for complete search history.

(56) References Cited

U.S. PATENT DOCUMENTS

| | | | | |
|---|---|---|---|---|
| 11,922,550 B1 * | 3/2024 | Ramesh | .................. | G06T 11/60 |
| 12,430,906 B1 * | 9/2025 | Lim | ....................... | G06V 10/82 |
| 12,518,560 B1 * | 1/2026 | Gupta | .................. | G06V 40/169 |
| 12,530,394 B2 * | 1/2026 | Chakiat | ................. | G06F 16/438 |
| 2021/0232620 A1 * | 7/2021 | Stanley | ................ | G06N 3/0464 |
| 2022/0012424 A1 * | 1/2022 | Tagra | ...................... | G06F 40/30 |
| 2022/0156992 A1 * | 5/2022 | Harikumar | ................ | G06T 7/11 |
| 2023/0419571 A1 * | 12/2023 | Zhang | ..................... | G06T 11/60 |
| 2024/0303516 A1 * | 9/2024 | Bergonzo | ............... | G06N 20/00 |
| 2026/0057011 A1 * | 2/2026 | Akriti | ................ | G06F 16/3322 |

OTHER PUBLICATIONS

Abeba Birhane, Vinay Prabhu, Sang Han, Vishnu Naresh Boddeti, and Alexandra Sasha Luccioni. Into the laions den: Investigating hate in multimodal datasets. Neural Information Processing Systems, arXiv,2311.03449v1, Nov. 6, 2023.

(Continued)

*Primary Examiner* — Michelle N Owyang
(74) *Attorney, Agent, or Firm* — Keller Preece PLLC

(57) ABSTRACT

One or more implementations include systems, non-transitory computer-readable media, and methods for generating and modifying databases using a fairness deduplication algorithm. In particular, the disclosed systems generate, within an embedding space, semantic embeddings from a plurality of digital images stored in a database. For instance, the disclosed systems identify, from among the semantic embeddings in the embedding space, a preservable embedding according to a preservation prototype indicating a semantic concept to preserve within the database. Furthermore, in one or more instances, the disclosed systems generate a modified database by pruning one or more digital images corresponding to semantic embeddings other than the preservable embedding from the database.

20 Claims, 14 Drawing Sheets

(56) References Cited

OTHER PUBLICATIONS

Abeba Birhane, Vinay Uday Prabhu, and Emmanuel Kahembwe. Multimodal datasets: misogyny, pornography, and malignant stereotypes. arXiv:2110.01963v1, Oct. 5, 2021.
Adyasha Maharana, Prateek Yadav, and Mohit Bansal. D2 pruning: Message passing for balancing diversity & difficulty in data pruning. arXiv preprint arXiv:2310.07931, Oct. 11, 2023.
Alec Radford, Jong Wook Kim, Chris Hallacy, A. Ramesh, Gabriel Goh, Sandhini Agarwal, Girish Sastry, Amanda Askell, Pamela Mishkin, Jack Clark, Gretchen Krueger, and Ilya Sutskever. Learning transferable visual models from natural language supervision. In International Conference on Machine Learning, 2021.
Alex Krizhevsky, Geoffrey Hinton, et al. Learning multiple layers of features from tiny images, Apr. 8, 2009.
Alexander Kirillov, Eric Mintun, Nikhila Ravi, Hanzi Mao, Chloe Rolland, Laura Gustafson, Tete Xiao, Spencer Whitehead, Alexander C Berg, Wan-Yen Lo, et al. Segment anything. arXiv preprint arXiv:2304.02643v1, Apr. 5, 2023.
Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, Jakob Uszkoreit, and Neil Houlsby. An image is worth 16×16 words: Transformers for image recognition at scale. In International Conference on Learning Representations, 2021.
Amro Abbas, Kushal Tirumala, Da'niel Simig, Surya Ganguli, and Ari S. Morcos. Semdedup: Data-efficient learning at web-scale through semantic deduplication, arXiv preprint arXiv:2303.09540v3, Mar. 22, 2023.
Angelina Wang, Solon Barocas, Kristen Laird, and Hanna Wallach. Measuring representational harms in image captioning. In ACM Conference on Fairness, Accountability, and Transparency, pp. 324-335, 2022.
Ashish Seth, Mayur Hemani, and Chirag Agarwal. Dear: Debiasing vision-language models with additive residuals. In Computer Vision and Pattern Recognition, pp. 6820-6829, 2023.
Ashish Vaswani, Noam Shazeer, Niki Parmar, Jakob Uszkoreit, Llion Jones, Aidan N Gomez, Łukasz Kaiser, and Illia Polosukhin. Attention is all you need. Neural Information Processing Systems, 30, 2017.
Aylin Caliskan, Joanna J Bryson, and Arvind Narayanan. Semantics derived automatically from language corpora contain human-like biases. Science, 356(6334):183-186, 2017.
Baharan Mirzasoleiman, Jeff Bilmes, and Jure Leskovec. Coresets for data-efficient training of machine learning models. In International Conference on Machine Learning, pp. 6950-6960, 2020.
Bart Thomee, David A Shamma, Gerald Friedland, Benjamin Elizalde, Karl Ni, Douglas Poland, Damian Borth, and Li-Jia Li. Yfcc100m: The new data in multimedia research. Communications of the ACM, pp. 64-73, 2016.
Ben Sorscher, Robert Geirhos, Shashank Shekhar, Surya Ganguli, and Ari Morcos. Beyond neural scaling laws: beating power law scaling via data pruning. In Neural Information Processing Systems, pp. 19523-19536, 2022.
Benjamin Recht, Rebecca Roelofs, Ludwig Schmidt, and Vaishaal Shankar. Do ImageNet classifiers generalize to ImageNet? In International Conference on Machine Learning, pp. 5389-5400, 2019.
Candace Ross, Boris Katz, and Andrei Barbu. Measuring social biases in grounded vision and language embeddings. In North American Chapter of the Association for Computational Linguistics, pp. 998-1008, 2021.
Chandler May, Alex Wang, Shikha Bordia, Samuel R Bowman, and Rachel Rudinger. On measuring social biases in sentence encoders. North American Chapter of the Association for Computational Linguistics, 2019.
Chao Jia, Yinfei Yang, Ye Xia, Yi-Ting Chen, Zarana Parekh, Hieu Pham, Quoc Le, Yun-Hsuan Sung, Zhen Li, and Tom Duerig. Scaling up visual and vision-language representation learning with noisy text supervision. In International conference on machine learning, pp. 4904-4916, 2021.
Chengcheng Guo, Bo Zhao, and Yasnbing Bai. Deepcore: A comprehensive library for coreset selection in deep learning. In International Conference on Database and Expert Systems Applications, Springer, arXiv preprint arXiv:2204.08499v3, Jun. 29, 2022.
Ching-Yao Chuang, Varun Jampani, Yuanzhen Li, Antonio Torralba, and Stefanie Jegelka. Debiasing vision-language models via biased prompts. arXiv preprint arXiv:2302.00070v2, May 15, 2023.
Christoph Schuhmann, Richard Vencu, Romain Beaumont, Robert Kaczmarczyk, Clayton Mullis, Aarush Katta, Theo Coombes, Jenia Jitsev, and Aran Komatsuzaki. LAION-400M: Open dataset of clip-filtered 400 million image-text pairs. NeurIPS Workshop on Data Centric AI, 2021.
Christoph Schuhmann, Romain Beaumont, Richard Vencu, Cade Gordon, Ross Wightman, Mehdi Cherti, Theo Coombes, Aarush Katta, Clayton Mullis, Mitchell Wortsman, et al. LAION-5B: An open large-scale dataset for training next generation image-text models. Neural Information Processing Systems, 35:25278-25294, 2022.
Conor Dougherty. Google photos mistakenly labels black people 'gorillas'. New York Times, Jul. 1, 2015.
Council of European Union. Directive Proposal (COM(2008)462), 2008. Available https://eur-lex.europa.eu/legal-content/en/TXT/?uri=CELEX%3A52008PC0426.
Dora Zhao, Angelina Wang, and Olga Russakovsky. Understanding and evaluating racial biases in image captioning. In International Conference on Computer Vision, pp. 14830-14840, 2021.
Ellis Monk. The Monk Skin Tone Scale, Harvard University, 2019.
Gabriel Ilharco, Mitchell Wortsman, Ross Wightman, Cade Gordon, Nicholas Carlini, Rohan Taori, Achal Dave, Vaishaal Shankar, Hongseok Namkoong, John Miller, Hannaneh Hajishirzi, Ali Farhadi, and Ludwig Schmidt. Open-clip, 2021. Zendo https://doi.org/10.5281/zenodo.5143773.
Hannah Devinney, Jenny Bjorklund, and Henrik Bjorklund. Theories of "gender" in NLP bias research. In ACM Conference on Fairness, Accountability, and Transparency, pp. 2083-2102, 2022.
Haotian Liu, Chunyuan Li, Yuheng Li, and Yong Jae Lee. Improved baselines with visual instruction tuning. arXiv preprint arXiv:2310.03744v2, May 15, 2023.
Hu Xu, Saining Xie, Xiaoqing Ellen Tan, Po-Yao Huang, Russell Howes, Vasu Sharma, Shang-Wen Li, Gargi Ghosh, Luke Zettlemoyer, and Christoph Feichtenhofer. Demystifying clip data. arXiv preprint arXiv:2309.16671v4, Apr. 7, 2023.
Hugo Berg, Siobhan Hall, Yash Bhalgat, Hannah Kirk, Aleksandar Shtedritski, and Max Bain. A prompt array keeps the bias away: Debiasing vision-language models with adversarial learning. In Proceedings of the 2nd Conference of the Asia-Pacific Chapter of the Association for Computational Linguistics and the 12th International Joint Conference on Natural Language Processing, pp. 806-822, 2022.
IEEE. IEEE Code of Ethics, 2020. Available https://www.IEEE.org/about/corporate/governance/p7-8.html.
Ilya Loshchilov and Frank Hutter. Decoupled weight decay regularization. In International Conference on Learning Representations, 2019.
Jade S. Franklin, Karan Bhanot, Mohamed Ghalwash, Kristin p. Bennett, Jamie McCusker, and Deborah L. McGuinness. An ontology for fairness metrics. In AAAI/ACM Conference on AI, Ethics, and Society, p. 265-275, 2022.
Jeff Johnson, Matthijs Douze, and Hervé Jégou. Billion-Scale Similarity Search with GPUs. IEEE Transactions on Big Data, 7(3):535-547, 2021.
Jeff M. Phillips. Coresets and sketches. arXiv preprint arXiv:1601.00617v1v2, Jun. 12, 2016.
Jia Deng, Wei Dong, Richard Socher, Li-Jia Li, Kai Li, and Li Fei-Fei. ImageNet: A large- scale hierarchical image database. In Computer Vision and Pattern Recognition, pp. 248-255, 2009.
Jiahui Yu, Zirui Wang, Vijay Vasudevan, Legg Yeung, Mojtaba Seyedhosseini, and Yonghui Wu. CoCa: Contrastive captioners are image-text foundation models. Transactions on Machine Learning Research, 2022.
Jieyu Zhao, Tianlu Wang, Mark Yatskar, Vicente Ordonez, and Kai-Wei Chang. Men also like shopping: Reducing gender bias

(56) References Cited

OTHER PUBLICATIONS amplification using corpus-level constraints. In Conference on Empirical Methods in Natural Language Processing, 2017.
Joseph R. Biden and The White House. Executive order on the safe, secure, and trustworthy development and use of artificial intelligence, 2023. Available: https://www.whitehouse.gov/briefing-room/presidential-actions/2023/10/30/executive-order-on-the-safe-secure-and-trustworthy-development-and-use-of-artificial-intelligence/.
Joy Buolamwini and Timnit Gebru. Gender Shades: Intersectional accuracy disparities in commercial gender classification. In ACM Conference on Fairness Accountability and Transparency, 2018.
Junnan Li, Dongxu Li, Caiming Xiong, and Steven Hoi. BLIP: Bootstrapping language-image pre-training for unified vision-language understanding and generation. In International Conference on Machine Learning, pp. 12888-12900, 2022.
Junnan Li, Dongxu Li, Silvio Savarese, and Steven Hoi. BLIP-2: Bootstrapping language- image pre-training with frozen image encoders and large language models. arXiv preprint arXiv:2301.12597v3, Jun. 15, 2023.
Junnan Li, Ramprasaath Selvaraju, Akhilesh Gotmare, Shafiq Joty, Caiming Xiong, and Steven Chu Hong Hoi. Align before Fuse: Vision and language representation learning with momentum distillation. Neural Information Processing Systems, pp. 9694-9705, 2021.
Justin Kerr, Chung Min Kim, Ken Goldberg, Angjoo Kanazawa, and Matthew Tancik. LERF: Language embedded radiance fields. In Proceedings of the IEEE/CVF International Conference on Computer Vision, pp. 19729-19739, 2023.
Kankan Zhou, Yibin Lai, and Jing Jiang. VLStereoSet: A study of stereotypical bias in pre-trained vision-language models. In Association for Computational Linguistics, 2022.
Kimmo Karkkainen and Jungseock Joo. FairFace: Face attribute dataset for balanced race, gender, and age for bias measurement and mitigation. In Winter Conference on Applications of Computer Vision, pp. 1548-1558, 2021.
Laura Gustafson, Chloe Rolland, Nikhila Ravi, Quentin Duval, Aaron Adcock, Cheng-Yang Fu, Melissa Hall, and Candace Ross. FACET: Fairness in computer vision evaluation benchmark. In International Conference on Computer Vision, pp. 20370-20382, 2023.
Ling Du, Anthony T.S. Ho, and Runmin Cong. Perceptual hashing for image authentication: A survey. Signal Processing: Image Communication 81, (2020) 115713.
Lisa Anne Hendricks, Kaylee Burns, Kate Saenko, Trevor Darrell, and Anna Rohrbach. Women Also Snowboard: Over-coming bias in captioning models. In Neural Information Processing Systems, 2016.
Mehdi Cherti and Romain Beaumont. Clip benchmark, 2023. GitHub repository https://github.com/LAION-AI/CLIP_benchmark.
Mehdi Cherti, Romain Beaumont, Ross Wightman, Mitchell Wortsman, Gabriel Ilharco, Cade Gordon, Christoph Schuhmann, Ludwig Schmidt, and Jenia Jitsev. Reproducible scaling laws for contrastive language-image learning. In Proceedings of the IEEE/CVF Conference on Computer Vision and Pattern Recognition, pp. 2818-2829, 2023.
Mohit Shridhar, Lucas Manuelli, and Dieter Fox. CLIPort: What and where pathways for robotic manipulation. In Conference on Robot Learning, pp. 894-906. PMLR, 2022.
Noa Garcia, Yusuke Hirota, Yankun Wu, and Yuta Nakashima. Uncurated image-text datasets: Shedding light on demographic bias. In Computer Vision and Pattern Recognition, pp. 6957-6966, 2023.
Nur Muhammad Mahi Shafiullah, Chris Paxton, Lerrel Pinto, Soumith Chintala, and Arthur Szlam. CLIP-Fields: Weakly supervised semantic fields for robotic memory. arXiv preprint arXiv:2210.05663v3, May 22, 2023.
Pengchuan Zhang, Xiujun Li, Xiaowei Hu, Jianwei Yang, Lei Zhang, Lijuan Wang, Yejin Choi, and Jianfeng Gao. VinVL: Revisiting visual representations in vision-language models. In Computer Vision and Pattern Recognition, pp. 5579-5588, 2021.
Peter Young, Alice Lai, Micah Hodosh, and Julia Hockenmaier. From image descriptions to visual denotations: New similarity metrics for semantic inference over event descriptions. Transactions of the Association for Computational Linguistics, pp. 67-78, 2014.
Ryan Mac. Facebook apologizes after A.I. puts 'primates' label on video of black men. New York Times, Sep. 3, 2021.
Safiya Noble. Algorithms of Oppression: How Search Engines Reinforce Racism. New York University Press, Cambridge MA, 2018.
Sahin Cem Geyik, Stuart Ambler, and Krishnaram Kenthapadi. Fairness-aware ranking in search & recommendation systems with application to LinkedIn talent search. In Proceedings of the 25th ACM SIGKDD International Conference on Knowledge Discovery & Data Mining, p. 2221-2231, 2019.
Samir Yitzhak Gadre, Gabriel Ilharco, Alex Fang, Jonathan Hayase, Georgios Smyrnis, Thao Nguyen, Ryan Marten, Mitchell Wortsman, Dhruba Ghosh, Jieyu Zhang, Eyal Orgad, Rahim Entezari, Giannis Daras, Sarah Pratt, Vivek Ramanujan, Yonatan Bitton, Kalyani Marathe, Stephen Mussmann, Richard Vencu, Mehdi Cherti, Ranjay Krishna, Pang Wei Koh, Olga Saukh, Alexander Ratner, Shuran Song, Hannaneh Hajishirzi, Ali Farhadi, Romain Beaumont, Sewoong Oh, Alex Dimakis, Jenia Jitsev, Yair Carmon, Vaishaal Shankar, and Ludwig Schmidt. Datacomp: In search of the next generation of multimodal datasets. arXiv preprint arXiv:2304.14108v5, Oct. 20, 2023.
Sandhini Agarwal, Gretchen Krueger, Jack Clark, Alec Radford, Jong Wook Kim, and Miles Brundage. Evaluating CLIP: towards characterization of broader capabilities and downstream implications. arXiv preprint arXiv:2108.02818v1, Aug. 5, 2021.
Sepehr Janghorbani and Gerard De Melo. Multi-Modal Bias: Introducing a framework for stereotypical bias assessment beyond gender and race in vision language models. European Chapter of the Association for Computational Linguistics, 2023.
Su Lin Blodgett, Solon Barocas, Hal Daume Ill, and Hanna Wallach. Language (Technology) Is Power: A critical survey of "Bias" in NLP. In Association for Computational Linguistics, pp. 5454-5476, 2020.
Svetlana Kiritchenko and Saif M. Mohammad. Examining gender and race bias in two hundred sentiment analysis systems. Conference on Lexical and Computational Semantics, 2018.
Ted Xiao, Harris Chan, Pierre Sermanet, AyzaanWahid, Anthony Brohan, Karol Hausman, Sergey Levine, and Jonathan Tompson. Robotic Skill acquisition via instruction augmentation with Vision-Language Models. In NeurIPS 2022 Foundation Models for Decision Making Workshop, 2022.
Tejas Srinivasan and Yonatan Bisk. Worst of Both Worlds: Biases compound in pre-trained vision-and-language models. In Proceedings of the 4th Workshop on Gender Bias in Natural Language Processing (GeBNLP), pp. 77-85, Jul. 15, 2022.
Tolga Bolukbasi, Kai-Wei Chang, James Y. Zou, Venkatesh Saligrama, and Adam Tauman Kalai. Man is to Computer Programmer as Woman is to Homemaker? Debiasing Word Embeddings. In Neural Information Processing Systems, 2016.
Tony Sun, Andrew Gaut, Shirlyn Tang, Yuxin Huang, Mai ElSherief, Jieyu Zhao, Diba Mirza, Elizabeth Belding, Kai-Wei Chang, and William Yang Wang. Mitigating gender bias in natural language processing: Literature review. In Association for Computational Linguistics, pp. 1630-1640, 2019.
Tsung-Yi Lin, Michael Maire, Serge Belongie, James Hays, Pietro Perona, Deva Ramanan, Piotr Dollár, and C Lawrence Zitnick. Microsoft COCO: Common objects in context. In European Conference on Computer Vision, pp. 740-755, 2014.
U.S. Equal Employment Opportunity Commission. Title VII of the Civil Rights Act of 1964, 1964. Available https://www.eeoc.gov/statutes/title-vii-civil-rights-act-1964.
Xi Chen, Xiao Wang, Soravit Changpinyo, AJ Piergiovanni, Piotr Padlewski, Daniel Salz, Sebastian Alexander Goodman, Adam Grycner, BasilMustafa, Lucas Beyer, Alexander Kolesnikov, Joan Puigcerver, Nan Ding, Keran Rong, Hassan Akbari, Gaurav Mishra, Linting Xue, Ashish Thapliyal, James Bradbury, Weicheng Kuo, Mojtaba Seyedhosseini, Chao Jia, Burcu Karagol Ayan, Carlos Riquelme, Andreas Steiner, Anelia Angelova, Xiaohua Zhai, Neil

(56) References Cited

OTHER PUBLICATIONS

Houlsby, and Radu Soricut. PaLI: A Jointly-Scaled Multilingual Language-Image Model. In International Conference on Learning Representations, 2023.
Xiaohua Zhai, Joan Puigcerver, Alexander Kolesnikov, Pierre Ruyssen, Carlos Riquelme, Mario Lucic, Josip Djolonga, Andr'e Susano Pinto, Maxim Neumann, Alexey Dosovitskiy, Lucas Beyer, Olivier Bachem, Michael Tschannen, Marcin Michalski, Olivier Bousquet, Sylvain Gelly, and Neil Houlsby. The visual task adaptation benchmark. arXiv preprint arXiv:1910.04867v1, Oct. 1, 2019.
Xueyan Zou, Jianwei Yang, Hao Zhang, Feng Li, Linjie Li, Jianfeng Gao, and Yong Jae Lee. Segment everything everywhere all at once. arXiv preprint arXiv:2304.06718v4, Jul. 11, 2023.
Yi Zhang, Junyang Wang, and Jitao Sang. Counterfactually measuring and eliminating social bias in vision-language pre-training models. arXiv preprint arXiv:2207.01056v2, Jul. 12, 2022.
Yusuke Hirota, Yuta Nakashima, and Noa Garcia. Quantifying societal bias amplification in image captioning. In Computer Vision and Pattern Recognition, pp. 13450-13459, 2022.
Ziwei Liu, Ping Luo, Xiaogang Wang, and Xiaoou Tang. Deep learning face attributes in the wild. arXiv preprint arXiv:1411.7766v2, Sep. 10, 2015.

* cited by examiner

Fig. 8
804
FairDeDup Selection
802
Maximum Distance Selection

902

| | | Full (100%) | SemDeDup (50%) | FairDeDup (50%) | Diff. (FDD-SDD) |
|---|---|---|---|---|---|
| **Gender** Masc / Femm | Mean | .104 | .113 (+ 9%) | **.109** (+ 5%) | –.004 |
| | Max | .303 | .346 (+14%) | **.298** (– 2%) | –.048 |
| | Gap | .199 | .233 (+17%) | **.189** (– 5%) | –.053 |
| **Skin Tone** Light / Dark | Mean | .100 | .112 (+12%) | **.105** (+ 5%) | –.007 |
| | Max | .354 | .342 (– 3%) | **.320** (–10%) | –.022 |
| | Gap | .254 | .230 (– 9%) | **.215** (–15%) | –.015 |
| **Age** Mid / Yng | Mean | .063 | **.059** (– 6%) | .075 (+19%) | +.016 |
| | Max | .268 | .230 (–14%) | **.225** (–16%) | –.005 |
| | Gap | .205 | .171 (–17%) | **.150** (–27%) | –.022 |
| **Age** Mid / Old | Mean | .098 | .096 (– 2%) | **.087** (–11%) | –.009 |
| | Max | .252 | .248 (– 2%) | **.153** (–39%) | –.095 |
| | Gap | .154 | .152 (– 1%) | **.066** (–57%) | –.008 |

*Fig. 9*

1002

| | **Full Data** (100%) | **SemDeDup** (50%) | **FairDeDup** (50%) |
|---|---|---|---|
| Gender | 32.92% | 31.91% | **32.29%** |
| Skin Tone | 51.28% | 50.46% | **51.06%** |
| Age | 44.74% | 43.62% | **44.06%** |

*Fig. 10*

GENERATING AND MODIFYING DIGITAL IMAGE DATABASES THROUGH FAIRNESS DEDUPLICATION

BACKGROUND

Recent years have seen significant developments in systems that generate, classify, and retrieve digital images based on text input. For example, some systems apply neural networks trained to identify or generate digital images corresponding to text prompts according to internal network parameters learned from training image datasets. In addition, recent dataset deduplication techniques have demonstrated that dataset pruning reduces computational cost of training vision-language pretrained (VLP) models without significant performance losses compared to training over an original (unpruned) dataset. Although conventional systems are able to apply VLP models for various use cases, these systems exhibit a number of technical deficiencies regarding biases inherited from training datasets.

SUMMARY

Embodiments of the present disclosure provide benefits and/or solve one or more of the foregoing or other problems in the art with systems, non-transitory computer-readable media, and methods for generating and modifying databases of digital images for training neural networks, such as vision-language models, using a fairness deduplication algorithm. For example, the disclosed systems remove or prune digital images from existing training image databases to reduce bias and improve fairness. In some embodiments, the fairness deduplication algorithm involves generating preservation prototypes representing semantic concepts to preserve within a training dataset and comparing the preservation prototypes with semantic embeddings extracted from digital images in the training dataset. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 9 illustrates an example table of experimental results in accordance with one or more embodiments.

FIG. 10 illustrates an example table of experimental results in accordance with one or more embodiments.

DETAILED DESCRIPTION

Figure 1:
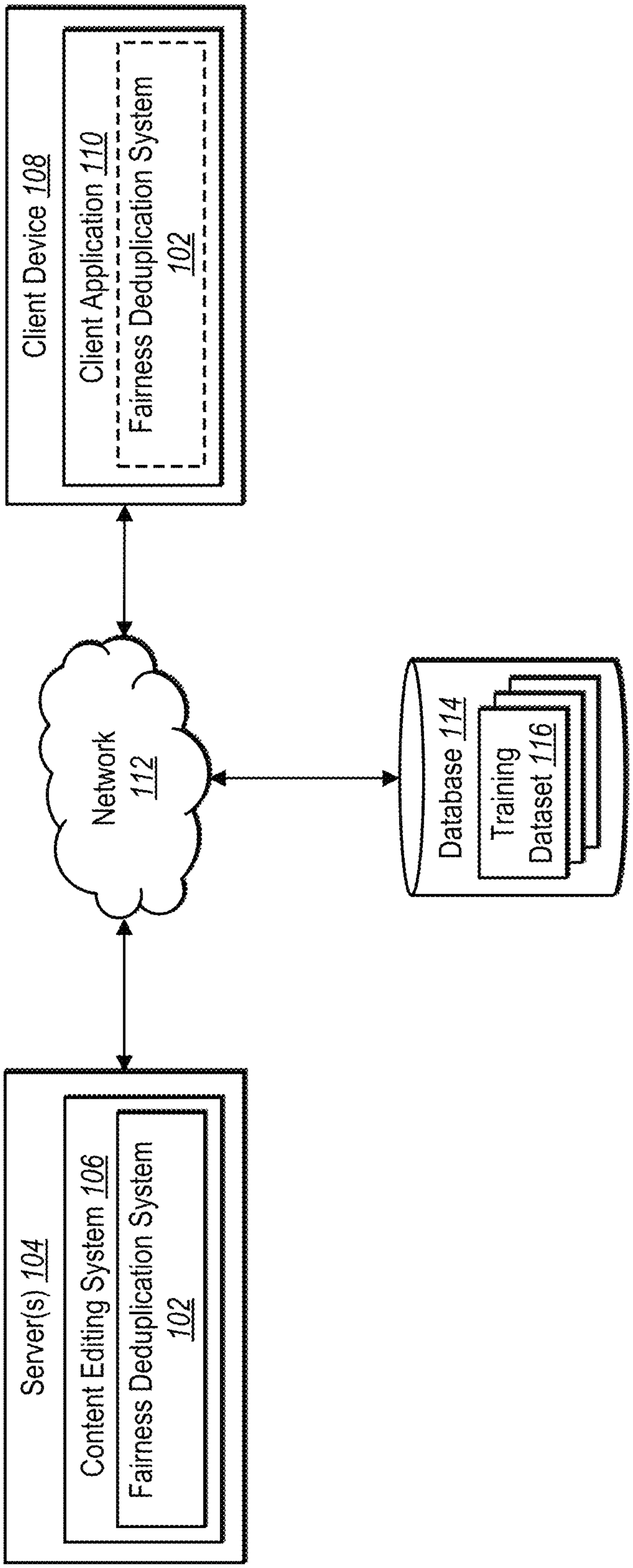
FIG. 1 illustrates an example system environment in which a fairness deduplication system operates in accordance with one or more embodiments.

This disclosure describes one or more embodiments of a fairness deduplication system that generates and/or modifies training databases of digital images using a fairness deduplication algorithm to improve fairness and reduce bias in trained models, such as vision-language models. In particular, in some embodiments, the fairness deduplication system identifies or determines digital images to preserve and/or digital images to prune from a training image database for reducing bias relating to one or more semantic concepts. In certain embodiments, the fairness deduplication system selects preservable digital images (for training models downstream) by extracting and comparing embeddings from digital images in the training database. For instance, the fairness deduplication system extracts semantic embeddings from digital images and compares the semantic embeddings with one or more preservation prototypes representing semantic concepts to preserve among samples (e.g., images) in the database.

As just mentioned, in some embodiments, the fairness deduplication system compares semantic embeddings with preservation prototypes. For example, the fairness deduplication system generates a preservation prototype by extracting and combining text embeddings from captions or template strings representing semantic concepts. In some cases, the fairness deduplication system identifies a caption that captures or defines a semantic concept to preserve. In one or more embodiments, the fairness deduplication system also extracts a text embedding from the caption within a semantic embedding space shared by semantic embeddings extracted from digital images. In some cases, the fairness deduplication system combines text embeddings from captions into a preservation prototype defining a semantic concept to preserve.

In one or more embodiments, the fairness deduplication system compares a preservation prototype with semantic embeddings extracted from digital images. For example, the fairness deduplication system iteratively selects semantic embeddings to compare with the preservation prototype. In some cases, the fairness deduplication system performs the comparison by determining a cosine similarity between the semantic embedding and the preservation prototype. In certain embodiments, the fairness deduplication system determines a duplicate neighborhood for each iteratively selected semantic embedding and compares other embeddings in the neighborhood with one or more preservation prototypes.

In one or more embodiments, after all embeddings in a neighborhood are compared, the fairness deduplication system designates a preservable embedding as a semantic embedding that is most similar to the least represented (or least similar running average) preservation prototype. In certain cases, the fairness deduplication system further repeats the comparison process for other semantic embeddings in their own iterations, defining duplicate neighborhoods, determining similarities in relation to preservation prototypes, and identifying preservable embeddings. In some embodiments, the fairness deduplication system further preserves a digital image corresponding to a preservable embedding to keep in a modified database for training neural networks, such as vision-language models.

As suggested above, many conventional variable font systems exhibit a number of shortcomings or disadvantages, particularly in computational efficiency in training neural networks (e.g., vision-language models) on standard databases. For example, conventional systems train vision-language pretrained (VLP) models, such as contrastive language-image pretraining (CLIP) models, using existing image databases, such as the LAION-400M dataset. However, many existing training image databases (such as LAION-400M) include millions of digital images which consume excessive amounts of memory (400 million images consuming more than 10 TB in total for LAION-400M) to store and which require excessive computational power to train neural networks. Indeed, experiments have demonstrated that many existing training datasets include redundant images and/or images that could otherwise be removed without comprising model accuracy after training. Accordingly, existing systems that train over such databases waste computational resources that could otherwise be preserved with a more efficient system.

Some existing systems have been developed in attempts to prune databases to reduce the computational expense of model training. For example, SemDeDup is a model developed by Amro Abbas et al. in *SemDeDup: Data-Efficient Learning at Web-Scale Through Semantic Deduplication*, arXiv:2303.09540 (2023) which performs semantic deduplication to prune databases using a maximum distance heuristic. However, while SemDeDup and other existing systems alleviate some computational expenses, these systems are nevertheless prone to biases in neural network outputs. For instance, SemDeDup prunes digital images using a maximum distance heuristic, selecting and preserving only samples most distance from cluster centroids (after clustering image embeddings). Upon testing, experimenters have demonstrated that models (e.g., CLIP models) trained on image datasets pruned using SemDeDup generate biased outputs due to the inherent biases present in the datasets themselves. Indeed, the maximum distance heuristic does not account for or integrate semantic concepts as part of the preservation consideration. Accordingly, models trained on datasets pruned using SemDeDup (or other existing systems) include learned parameters that do not account for semantic concepts designated for preservation, such as concepts representing or describing underrepresented social groups in image datasets (or other custom-defined concepts.

As suggested above, embodiments of the fairness deduplication system provide certain improvements or advantages over conventional variable font systems. For example, embodiments of the fairness deduplication system improve computational efficiency over prior systems. While prior systems consume excessive computational resources when training neural networks (e.g., VLP models) on very large training datasets, the fairness deduplication system reduces the computational expense of training models by pruning or modifying datasets. Indeed, the fairness deduplication system deduplicates training images by removing redundant images according to a fairness deduplication algorithm, thereby preserving training resources compared to many prior systems while retaining model accuracy.

In addition, certain embodiments of the fairness deduplication system provide improved fairness in trained models. Indeed, by training a model on a dataset pruned using the fairness deduplication algorithm described herein, the fairness deduplication system reduces biases in parameters of models trained on modified datasets. For instance, compared to prior systems like SemDeDup, the fairness deduplication system prunes digital images from a training dataset according to preservation prototypes defining semantic concepts (e.g., describing underrepresented social groups) designated for preserving within the training dataset. As explained in further detail below, experimenters have demonstrated reduced bias in neural networks (e.g., CLIP models) trained on datasets pruned by the fairness deduplication system.

Additional detail regarding the fairness deduplication system will now be provided with reference to the figures. For example, FIG. 1 illustrates a schematic diagram of an example system environment for implementing a fairness deduplication system 102 in accordance with one or more embodiments. An overview of the fairness deduplication system 102 is described in relation to FIG. 1. Thereafter, a more detailed description of the components and processes of the fairness deduplication system 102 is provided in relation to the subsequent figures.

As shown, the environment includes server(s) 104, a client device 108, a database 114, and a network 112. Each of the components of the environment communicate via the network 112, and the network 112 is any suitable network over which computing devices communicate. Example networks are discussed in more detail below in relation to FIG. 13.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 13. Although FIG. 1 illustrates a single instance of the client device 108, in some embodiments, the environment includes multiple different client devices, each associated with a different user. The client device 108 communicates with the server(s) 104 and/or the content editing system 106 via network 112. For example, the client device 108 receives template string data for defining preservation prototypes and provides information to server(s) 104 indicating the template strings for the preservation prototypes.

As shown in FIG. 1, the client device 108 includes a client application 110. In particular, the client application 110 is a web application, a native application installed on the client device 108 (e.g., a mobile application or a desktop application), or a cloud-based application where all or part of the functionality is performed by the server(s) 104. The client application 110 presents or displays information to a user, including a prototype interface for defining a preservation prototype through entry of one or more template strings.

As also illustrated in FIG. 1, the environment includes the server(s) 104. The server(s) 104 generates, tracks, stores, processes, receives, and transmits electronic data, such as template strings, digital images, extracted embeddings from template strings and digital images, and embedding space data indicating preservable embeddings. For example, the server(s) 104 receives data from the client device 108 in the form of interaction data defining one or more template strings for semantic concepts to preserve in a database of training digital images. In response, the server(s) 104 provides data to the client device 108 in the form of a trained model (e.g., a CLIP-based model) or an output generated by a trained model that is trained according to the semantic concepts defined by the template strings. For example, the server(s) 104 communicate with the database 114 to access and modify the training dataset 116 that includes a set of training digital images. In some cases, modifying the training dataset 116 involves pruning digital images according to a fairness deduplication algorithm that preserves images corresponding to particular semantic concepts.

In some embodiments, the server(s) 104 communicates with the client device 108 to transmit and/or receive data via the network 112. In some embodiments, the server(s) 104 comprises a distributed server where the server(s) 104 includes a number of server devices distributed across the network 112 and located in different physical locations. The server(s) 104 comprise a content server, an application server, a communication server, a web-hosting server, a multidimensional server, or a machine learning server.

As further shown in FIG. 1, the server(s) 104 also includes the fairness deduplication system 102 as part of a content editing system 106. For example, in one or more implementations, the content editing system 106 stores, generates, modifies, edits, enhances, provides, distributes, and/or shares digital content, such as digital images or digital videos. For example, the content editing system 106 provides digital content for editing or other forms of digital processing. In some implementations, the content editing system 106 provides digital content to particular digital profiles associated with client devices (e.g., the client device 108).

In one or more embodiments, the server(s) 104 includes all, or a portion of, the fairness deduplication system 102. For example, the fairness deduplication system 102 operates on the server(s) 104 to generate or modify a database of training digital images (e.g., the training dataset 116) by pruning digital images according to a fairness deduplication algorithm that preserves images corresponding to the defined semantic concepts. In some embodiments, the client device 108 includes all or part of the fairness deduplication system 102. For example, the client device 108 generates, obtains (e.g., downloads), or uses one or more aspects of the fairness deduplication system 102, such as the fairness deduplication algorithm. Indeed, in some implementations, as illustrated in FIG. 1, the fairness deduplication system 102 is located in whole or in part of the client device 108 (e.g., as part of the client application 110). For example, the fairness deduplication system 102 includes a web hosting application that allows the client device 108 to interact with the server(s) 104. To illustrate, in one or more implementations, the client device 108 accesses a web page supported and/or hosted by the server(s) 104.

In one or more embodiments, the client device 108 and the server(s) 104 work together to implement the fairness deduplication system 102. For example, in some embodiments, the server(s) 104 train one or more neural networks (e.g., CLIP models or other vision-language models for generating, classifying, or retrieving digital images according to text data) and provide the one or more neural networks to the client device 108 for implementation. In some embodiments, the server(s) 104 trains one or more neural networks together with the client device 108.

Although FIG. 1 illustrates a particular arrangement of the environment, in some embodiments, the environment has a different arrangement of components and/or may have a different number or set of components altogether. For instance, as mentioned, the fairness deduplication system 102 is implemented by (e.g., located entirely or in part on) the client device 108. In addition, in one or more embodiments, the client device 108 communicates directly with the fairness deduplication system 102, bypassing the network 112.

Figure 2:
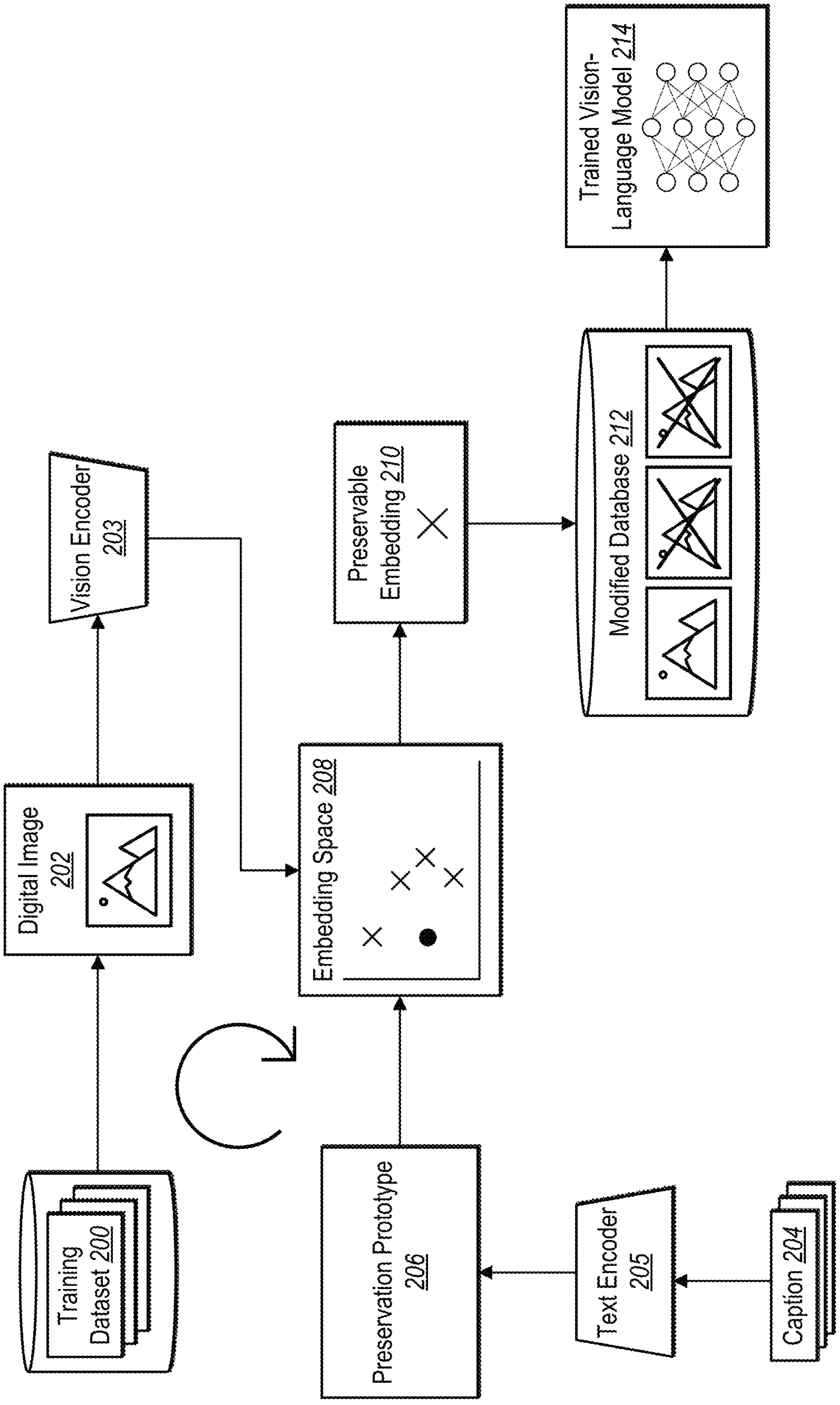
FIG. 2 illustrates an overview of generating and modifying a database using a fairness deduplication algorithm in accordance with one or more embodiments.

As mentioned, in one or more embodiments, the fairness deduplication system 102 generates and/or modifies a database of training digital images according to a fairness deduplication algorithm. In particular, the fairness deduplication system 102 prunes digital images from a training database to preserve images that represent or correspond to defined semantic concepts, such as protected demographic groups, underrepresented topics, and/or other custom-defined concepts. FIG. 2 illustrates an example overview of generating or modifying a database of training digital images in accordance with one or more embodiments. Additional detail regarding the various acts and processes introduced in relation to FIG. 2 is provided thereafter with reference to subsequent figures.

As illustrated in FIG. 2, the fairness deduplication system 102 identifies or accesses a training dataset 200. In particular, the fairness deduplication system 102 accesses a database that stores or houses the training dataset 200. In some cases, the training dataset 200 includes or refers to a repository of digital images for training neural networks, such as vision-language models including CLIP models. In some embodiments, a vision-language model includes or refers to a model as described by Simon Jenni et al. in U.S. patent application Ser. No. 18/443,808, titled BUILDING VISION-LANGUAGE MODELS USING MASKED DISTILLATION FROM FOUNDATION MODELS, filed Feb. 16, 2024, which is hereby incorporated by reference in its entirety. In addition, the fairness deduplication system 102 accesses or identifies a digital image 202 from the training dataset 200.

As also illustrated in FIG. 2, the fairness deduplication system 102 generates or extracts a semantic embedding from the digital image 202. More particularly, the fairness deduplication system 102 utilizes a vision encoder 203 (of a vision-language model) to extract a semantic embedding within an embedding space 208. In some cases, the semantic embedding represents a vector or a mathematical representation of textual meaning or context represented or depicted by pixels of the digital image 202. As shown, the fairness deduplication system 102 generates a semantic embedding represented by an "x" within the embedding space 208.

As further illustrated in FIG. 2, the fairness deduplication system 102 generates or determines a preservation prototype 206. To elaborate, the fairness deduplication system 102 generates the preservation prototype 206 by combining and encoding captions generated from template strings. For instance, the fairness deduplication system 102 receives one or more template strings as text inputs from a client device (e.g., "A photo of a dog") and further generates captions summarizing or condensing the template strings, such as the caption 204. From the caption 204, the fairness deduplication system 102 generates a text embedding representing or encoding the caption 204 in vector form. Specifically, the fairness deduplication system 102 utilizes a text encoder 205 (as part of the same vision-language model as the vision encoder 203) to extract a text embedding from the caption 204 (and additional text embeddings from other captions).

In addition, the fairness deduplication system 102 combines (e.g., averages) the text embedding from the caption 204 with one or more additional text embeddings extracted from other captions corresponding to the same semantic concept (e.g., the concept of "dog" in the example). In some cases, the preservation prototype 206 is a vector or mathematical representation of (an amalgam of) one or more semantic concepts defined by captions and/or template strings. As shown, the fairness deduplication system 102 embeds the preservation prototype 206 into the embedding space 208, as represented by the closed circle or dot.

As shown in FIG. 2, in some embodiments, the fairness deduplication system 102 repeats one or more acts or processes for multiple iterations. For example, the fairness deduplication system 102 identifies multiple digital images from the training dataset 200 and encodes the digital images into semantic embeddings within the embedding space 208. Indeed, as shown, the fairness deduplication system 102 generates multiple semantic embeddings represented by the "x" shapes in the embedding space 208. In some cases, the fairness deduplication system 102 also generates or extracts additional preservation prototypes representing other semantic concepts within the embedding space 208.

In addition, the fairness deduplication system 102 compares the semantic embeddings of digital images with the preservation prototype 206 (and/or other preservation prototypes) to identify, select, or determine a preservable embedding 210. For example, the fairness deduplication system 102 determines a preservable embedding 210 as a semantic embedding that represents or corresponds to a semantic concept defined by the preservation prototype 206. Indeed, to select the preservable embedding 210, the fairness deduplication system 102 implements or applies a fairness deduplication algorithm to determine and compare similarities of semantic embeddings relative to the preservation prototype 206. In some cases, the fairness deduplication system 102 selects the preservable embedding 210 as a semantic embedding that is most similar to (e.g., closest in the embedding space 208 to), or within a threshold similarity of, a least similar preservation prototype, such as the preservation prototype 206. Additional detail regarding the fairness deduplication algorithm is provided below.

As further illustrated in FIG. 2, the fairness deduplication system 102 generates a modified database 212. More particularly, the fairness deduplication system 102 generates the modified database 212 by modifying the training dataset 200 to remove or prune digital images. In some embodiments, the fairness deduplication system 102 prunes digital images according to their similarities with the preservation prototype 206. For instance, the fairness deduplication system 102 preserves a digital image corresponding to the preservable embedding 210 (e.g., the digital image from which the preservable embedding was extracted) and prunes (all) other digital images. In some cases, the fairness deduplication system 102 prunes digital images on a cluster-by-cluster basis and/or on a neighborhood-by-neighborhood basis. Additional detail regarding the pruning and preservation of the fairness deduplication algorithm is provided below.

As further illustrated in FIG. 2, the fairness deduplication system 102 generates a trained vision-language model 214. Indeed, in some embodiments, the fairness deduplication system 102 trains a model, such as a neural network, using the modified database 212. For instance, the fairness deduplication system 102 trains a vision-language model to generate, classify, or retrieve digital images according to training digital images included (e.g., preserved or unpruned) within the modified database 212. In some cases, the fairness deduplication system 102 generates the trained vision-language model 214 by updating parameters over multiple training iterations to improve the accuracy and reduce loss in predicted outputs.

The fairness deduplication system 102 further implements or applies a trained neural network to generate a digital image output according to its parameters learned through training over the modified database 212. In some embodiments, the digital image output of a neural network trained on the modified database 212 exhibits improved fairness (e.g., reduced bias) compared to models trained over unpruned datasets and/or datasets pruned using prior deduplication algorithms.

In some embodiments, a neural network (e.g., a vision-language model) includes or refers to a machine learning model that is trainable and/or tunable based on inputs to generate predictions, determine classifications, or approximate unknown functions. For example, a neural network includes a model of interconnected artificial neurons (e.g., organized in layers) that communicate and learn to approximate complex functions and generate outputs (e.g., digital images and/or digital text) based on a plurality of inputs provided to the neural network. In some cases, a neural network refers to an algorithm (or set of algorithms) that implements deep learning techniques to model high-level abstractions in data. For example, a neural network includes a deep neural network, a convolutional neural network, a recurrent neural network (e.g., an LSTM), a graph neural network, a transformer, or a generative neural network (e.g., a generative adversarial neural network or a diffusion neural network).

Figure 3:
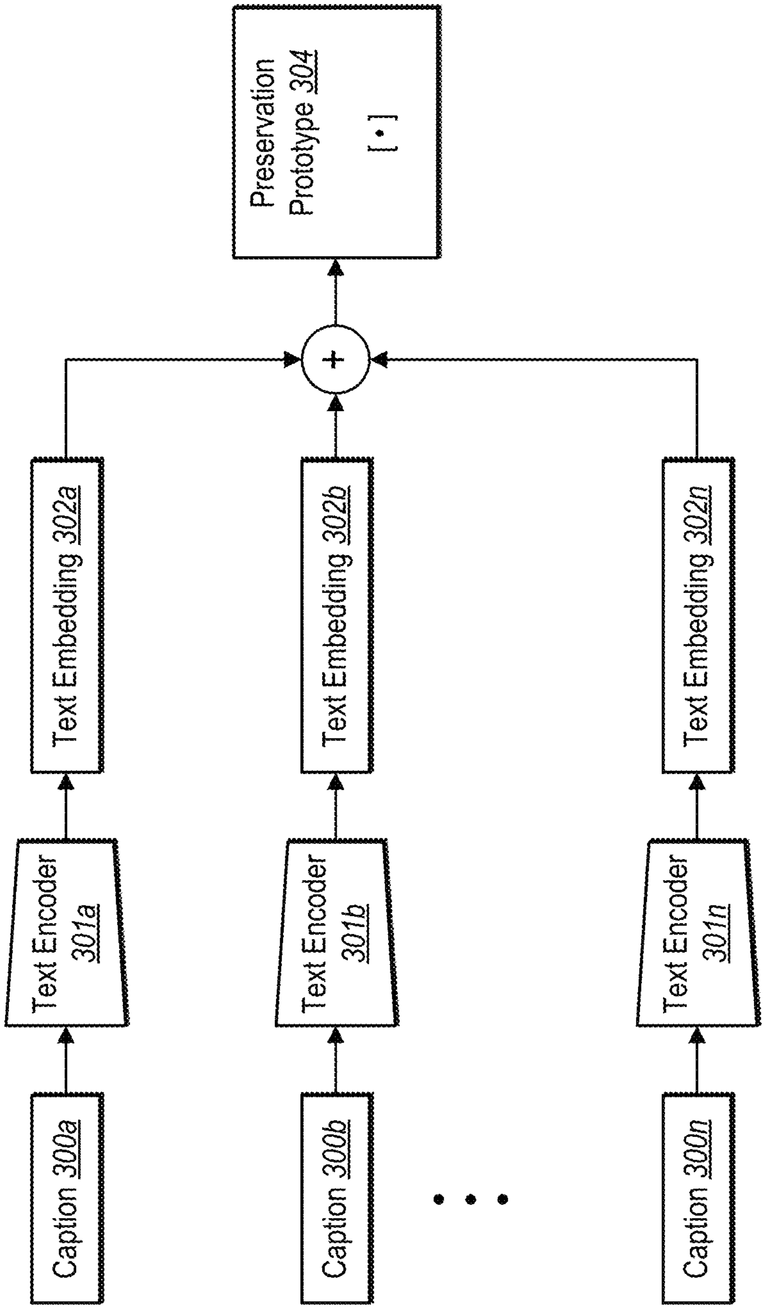
FIG. 3 illustrates an example diagram for generating a preservation prototype in accordance with one or more embodiments.

As indicated above, in certain embodiments, the fairness deduplication system 102 generates a preservation prototype. In particular, the fairness deduplication system 102 generates a preservation prototype as a basis for determining preservable embeddings (and corresponding digital images) for representing semantic concepts within training datasets. FIG. 3 illustrates an example diagram of generating a preservation prototype in accordance with one or more embodiments.

As illustrated in FIG. 3, the fairness deduplication system 102 determines or generates a caption 300*a*. In particular, the fairness deduplication system 102 generate the caption 300*a* from a template string including a number of words or characters describing a semantic concept to preserve within a digital image training database. For example, the fairness deduplication system 102 generates the caption 300*a* by condensing or summarizing a template string into a threshold number of words or characters representing the semantic concept. The fairness deduplication system 102 likewise generates additional captions, such as the caption 300*b* down to the caption 300*n*, from template strings defining or representing the same semantic concept (or semantic concepts within a threshold similarity of one another). In some cases, a semantic concept includes or refers to a topic or a concept, such as a protected demographic group or category (e.g., racial minorities, age ranges, or genders), or a custom topic, such as a topic determined from a user-entered template string (e.g., long-eared dogs, sports cars, nurses, or doctors).

From the caption 300*a*, the fairness deduplication system 102 generates or extracts a text embedding 302*a*. As shown, the fairness deduplication system 102 utilizes a text encoder 301*a* to generate or extract the text embedding 302*a*. In particular, the fairness deduplication system 102 generates the text embedding 302*a* as a vector representation of the caption 300*a* within an embedding space. The fairness deduplication system 102 likewise generates or extracts embeddings from additional captions as well, including the text embedding 302*b* through the text embedding 302*n*. In some embodiments, the text encoder 301*a* is the same encoder as the text encoder 301*b* through the text encoder 301*n*, reapplied to generate text embeddings from respective captions.

As further illustrated in FIG. 3, the fairness deduplication system 102 generates a preservation prototype 304. More specifically, the fairness deduplication system 102 generates the preservation prototype 304 by combining (e.g., averaging) the text embeddings extracted from the semantic-concept-specific captions. Indeed, the fairness deduplication system 102 generates the preservation prototype 304 to represent or define a semantic concept to preserve among image samples for training vision-language models.

Figure 4:
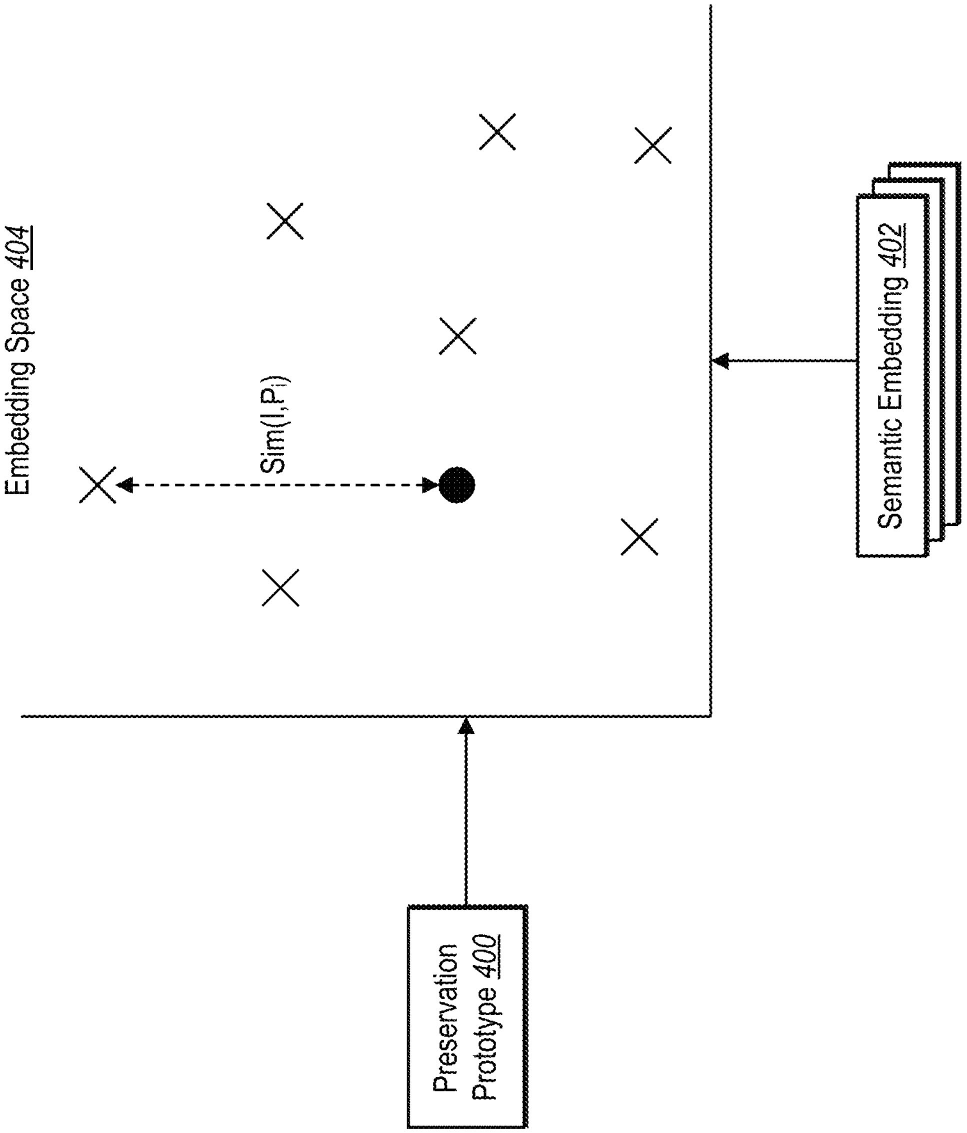
FIG. 4 illustrates an example diagram of determining similarity scores between semantic embeddings and preservation prototypes in accordance with one or more embodiments.

As noted above, in certain described embodiments, the fairness deduplication system 102 compares one or more preservation prototypes with one or more semantic embeddings extracted from digital images. In particular, the fairness deduplication system 102 determines similarity scores between preservation prototypes and semantic embeddings. FIG. 4 illustrates an example diagram for comparing preservation prototypes with semantic embeddings in accordance with one or more embodiments.

As illustrated in FIG. 4, the fairness deduplication system 102 generates a preservation prototype 400. As described above, the fairness deduplication system 102 generates the preservation prototype 400 by combining text embeddings from captions (or template strings) representing a semantic concept. As shown, the fairness deduplication system 102 generates the preservation prototype and embeds it within the embedding space 404, as indicated by the closed circle or dot.

As further illustrated in FIG. 4, the fairness deduplication system 102 generates or extracts a set of semantic embeddings from digital images stored in a database of training images. For example, the fairness deduplication system 102 generates the semantic embedding 402 as a vector representation of a (semantic meaning of a) digital image. In addition, the fairness deduplication system 102 encodes the semantic embedding 402 within the embedding space 404 shared by other semantic embeddings (represented by "x" symbols) and the preservation prototype 400.

In one or more embodiments, the fairness deduplication system 102 compares the semantic embedding 402 with the preservation prototype 400. For example, the fairness deduplication system 102 determines a cosine similarity (or a distance within the embedding space 404) to compare the semantic embedding with the preservation prototype 400. Indeed, the fairness deduplication system 102 utilizes an embedding model (to generate or extract semantic embeddings and/or preservation prototypes) that supports image clustering as well as image-text alignment scores for determining cosine similarities. In some embodiments, the fairness deduplication system 102 utilizes the following similarity function to determine the similarity between a preservation prototype and a semantic embedding of a digital image:

$$sim\,(I, P_i) = \Phi_I(I)^{P_i}\Phi_{P_i}(P_i)/\|\Phi_I(I)\|\,\|\Phi_{P_i}(P_i)\|$$

where $\Phi_I$: $I \rightarrow \mathbb{R}^d$ represents a semantic embedding (e.g., the semantic embedding 402) produced by a vision encoder (of the embedding model), and $\Phi_{P_i}$: $P_i \rightarrow \mathbb{R}^d$ represents a preservation prototype (e.g., the preservation prototype 400) generated by a text encoder (of the embedding model). Using the cosine similarity function, the fairness deduplication system 102 thus determines or measures how well an image (corresponding to the semantic embedding 402) aligns with a semantic concept (corresponding to the preservation prototype 400). The fairness deduplication system 102 likewise compares other semantic embeddings with the preservation prototype 400 as well as other preservation prototypes representing their own respective semantic concepts within the embedding space 404.

Figure 5:
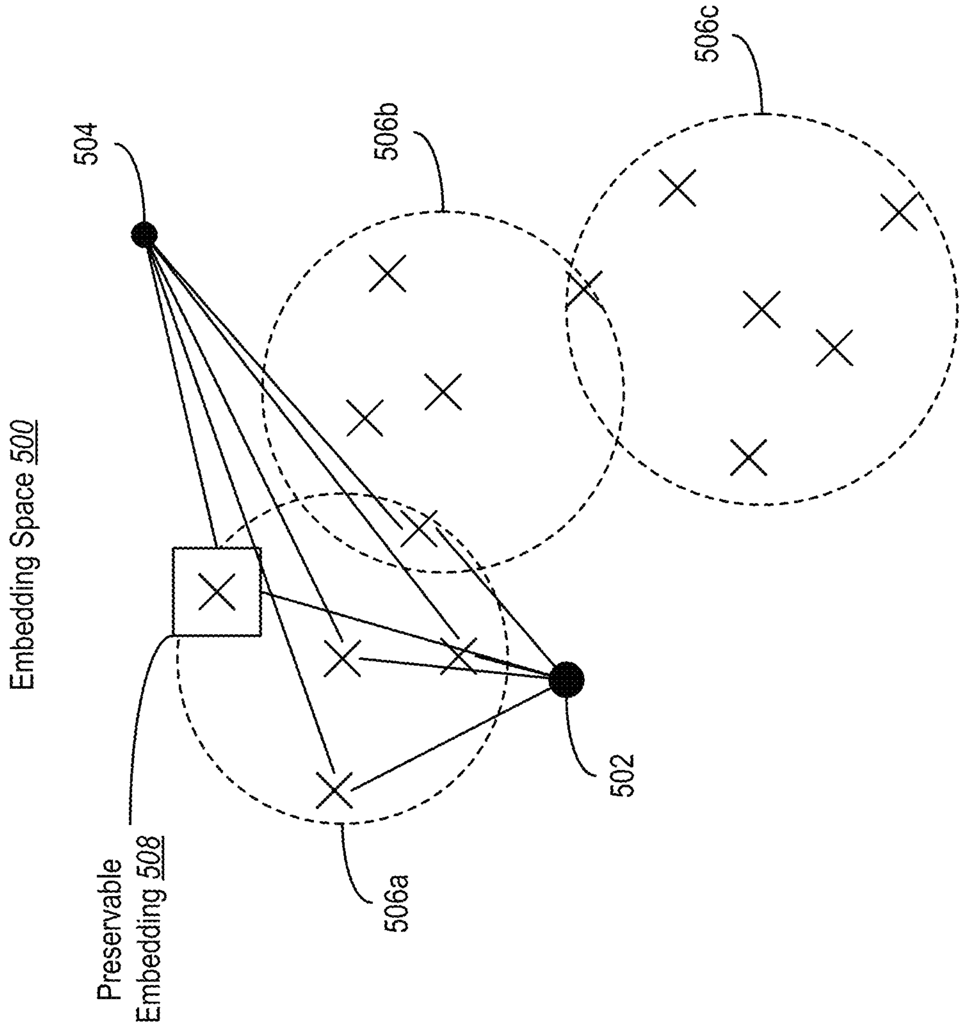
FIG. 5 illustrates an example diagram for selecting a preservable embedding in accordance with one or more embodiments.

As mentioned above, in certain embodiments, the fairness deduplication system 102 selects preservable embeddings based on comparisons with one or more preservation prototypes. In particular, the fairness deduplication system 102 selects or determines a preservable embedding from among semantic embeddings in an embedding space based on comparing the semantic embeddings with the preservation prototype. FIG. 5 illustrates an example diagram for determining or selecting preservable embeddings in accordance with one or more embodiments.

As illustrated in FIG. 5, the fairness deduplication system 102 generates or extracts semantic embeddings from a plurality of digital images, as represented by the "x" shapes in the embedding space 500. In addition, the fairness deduplication system 102 generates or extracts preservation prototypes in the embedding space 500, including the preservation prototype 502 and the preservation prototype 504. In some embodiments, the fairness deduplication system 102 further compares the semantic embeddings with the preservation prototypes to determine or select the preservable embedding 508 and/or to determine which semantic embeddings (and corresponding images) to prune.

To elaborate, the fairness deduplication system 102 determines and analyzes duplicate neighborhoods among the semantic embeddings. For example, the fairness deduplication system 102 determines a duplicate neighborhood defining semantic embeddings within a threshold distance of a particular sample semantic embedding. Indeed, the fairness deduplication system 102 selects a semantic embedding, determines a duplicate neighborhood for the semantic embedding, and analyzes the semantic embeddings within the duplicate neighborhood to select a preservable embedding. The fairness deduplication system 102 further repeats the process of selecting a sample embedding, determining its neighborhood, and identifying a preservable embedding for each semantic embedding in the embedding space 500 (each at its own iteration until all embeddings are selected/visited), preserving only a single embedding for each duplicate neighborhood.

As shown in FIG. 5, the fairness deduplication system 102 determines a duplicate neighborhood 506*a*. In particular, the fairness deduplication system 102 (randomly) selects a semantic embedding of a digital image and determines all other semantic embeddings within a $1-\epsilon$ similarity of the semantic embedding, as indicated by the dashed radius or circle centered around the semantic embedding in the middle. In some cases, the fairness deduplication system 102 determines and tracks a running average similarity between preserved semantic embeddings and each of the preservation prototypes, such as the preservation prototype 502 and the preservation prototype 504. Specifically, the fairness deduplication system 102 determines a running average similarity by averaging similarity scores between embeddings (in a cluster or in the embedding space 500) and a preservation prototype, updating the average similarity at each iteration for a newly sampled embedding. In this fashion, the fairness deduplication system 102 determines an average similarity of the semantic embeddings in the embedding space 500 (and/or within the duplicate neighborhood 506*a*) and the preservation prototype 502. The fairness deduplication system 102 determines another average similarity of the semantic embeddings to the preservation prototype 504.

The fairness deduplication system 102 thus compares the preservation prototypes in the embedding space 500 (e.g., the preservation prototype 502 and the preservation prototype 504) to determine a least similar running average preservation prototype (or a least represented preservation prototype). For instance, the fairness deduplication system 102 determines a preservation prototype corresponding to a semantic concept that is least represented (or under a threshold degree of representation) by the digital images corresponding to the semantic embeddings in the embedding space 500. In some cases, the least represented semantic concept corresponds to a preservation prototype that has a smallest running average similarity (e.g., distance or cosine similarity) in relation to the semantic embeddings in the embedding space 500. As shown, the fairness deduplication system 102 determines that the preservation prototype 504 is less similar (or less represented) than the preservation prototype 502, as it is farther on average from the semantic embeddings in the embedding space 500.

In certain embodiments, the fairness deduplication system 102 determines or selects the preservable embedding 508 based on the running average similarity of preservation prototypes. For example, within the duplicate neighborhood 506*a*, the fairness deduplication system 102 determines a semantic embedding that is closest (e.g., most similar or that satisfies a threshold measure of similarity) to the least similar (or least represented) preservation prototype (e.g., the preservation prototype 504 in this case). As shown, the fairness deduplication system 102 thus selects the preservable embedding 508 as a semantic embedding to preserve among those in the duplicate neighborhood 506*a* (because it is closest to the least similar prototype, the preservation prototype 504). In some cases, the fairness deduplication system 102 preserves a semantic embedding with a highest average similarity across all (or a set of) preservation prototypes for the first neighborhood visited in the embedding space 500.

As shown, the fairness deduplication system 102 repeats the process of selecting a preservable embedding for additional duplicate neighborhoods. Indeed, upon selecting the preservable embedding 508 for the duplicate neighborhood 506*a*, the fairness deduplication system 102 moves to the next iteration by randomly selecting another (unvisited) semantic embedding in the embedding space 500 (or within a particular cluster if the data is clustered). As shown, the fairness deduplication system 102 thus generates or determines the duplicate neighborhood 506*b* and repeats the process of determining a preservable embedding. Likewise, upon completion of the iteration for the duplicate neighborhood 506*b*, the fairness deduplication system 102 moves to the next iteration and determines the duplicate neighborhood 506*c* along with its preservable embedding.

Figure 6A:
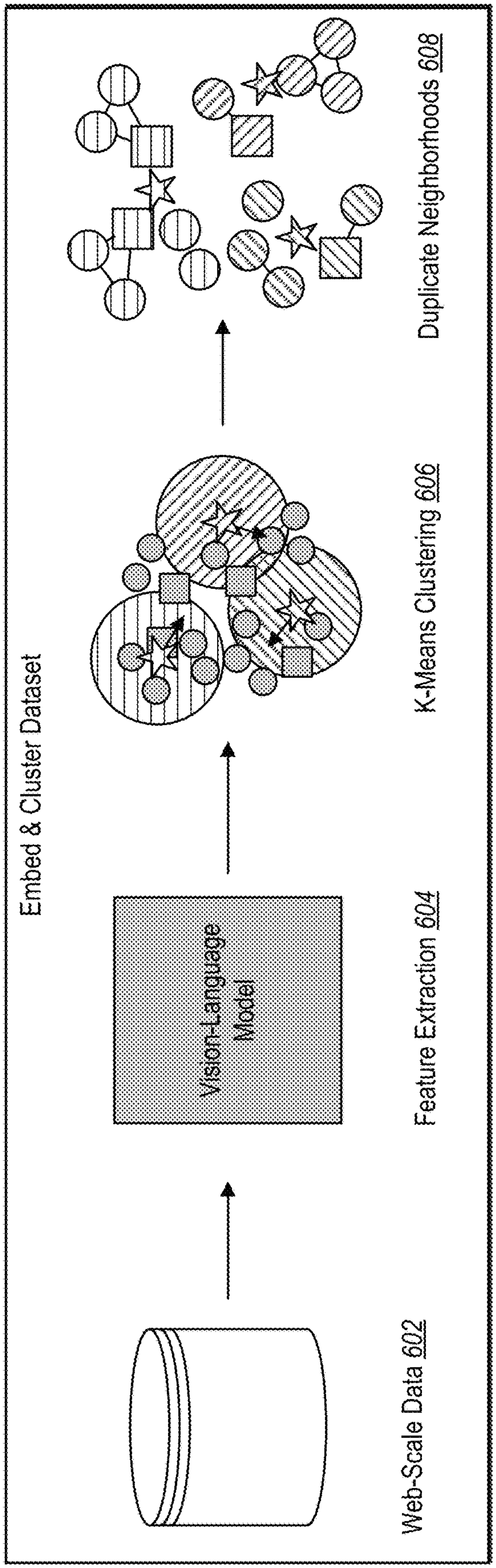
FIG. 6A illustrates an example diagram of generating duplicate neighborhoods from data clusters in accordance with one or more embodiments.

In one or more embodiments, the fairness deduplication system 102 analyzes duplicate neighborhoods of semantic embeddings on a cluster-by-cluster basis. In particular, the fairness deduplication system 102 performs a clustering process to cluster semantic embeddings extracted from digital images. FIG. 6A illustrates an example diagram for determining duplicate neighborhoods based on a clustering process in accordance with one or more embodiments.

As shown in FIG. 6A, the fairness deduplication system 102 accesses web-scale data 602, such as a database storing training digital images. From the web-scale data, the fairness deduplication system 102 performs a feature extraction 604. More specifically, the fairness deduplication system 102 extracts (latent) features from digital images to generate semantic embeddings of the digital images in an embedding space. As shown, in some cases, the fairness deduplication system 102 uses an encoder of a vision-language model (e.g., a CLIP model) to perform the feature extraction 604.

As also shown in FIG. 6A, the fairness deduplication system 102 performs a k-means clustering 606. For example, the fairness deduplication system 102 utilizes a k-means clustering technique to cluster the semantic embeddings in the embedding space. In some case, the fairness deduplication system 102 thus generates embedding clusters from the semantic embeddings. By clustering, the fairness deduplication system 102 increases the speed of searching as part of deduplicating semantic embeddings, especially in situations where the web-scale data 602 is extremely large and searching across the entire repository is computationally prohibitive. Indeed, by clustering the semantic embeddings, the fairness deduplication system 102 can perform a fairness deduplication algorithm on a per-cluster basis.

As also shown, the fairness deduplication system 102 determines duplicate neighborhoods 608. Indeed, the fairness deduplication system 102 iteratively selects semantic embeddings and defines a duplicate neighborhood for a selected embedding to include semantic embeddings within a threshold similarity of the selected embedding. In some embodiments, the fairness deduplication system 102 generates clusters and determines duplicate neighborhoods using the approach described by Amro Abbas et al. in *SemDeDup: Data-Efficient Learning at Web-Scale Through Semantic Deduplication*, cited above. As shown, the fairness deduplication system 102 generates three clusters, each represented by the different dashed patterns in the shapes. Within the clusters, the fairness deduplication system 102 identifies the duplicate neighborhoods 608 as shapes that are connected by edges in the diagram. The star shapes represent cluster centers, and the square and circle shapes represent two distinct subgroups (or distinct semantic concepts) within the three determined clusters.

Figure 6B:
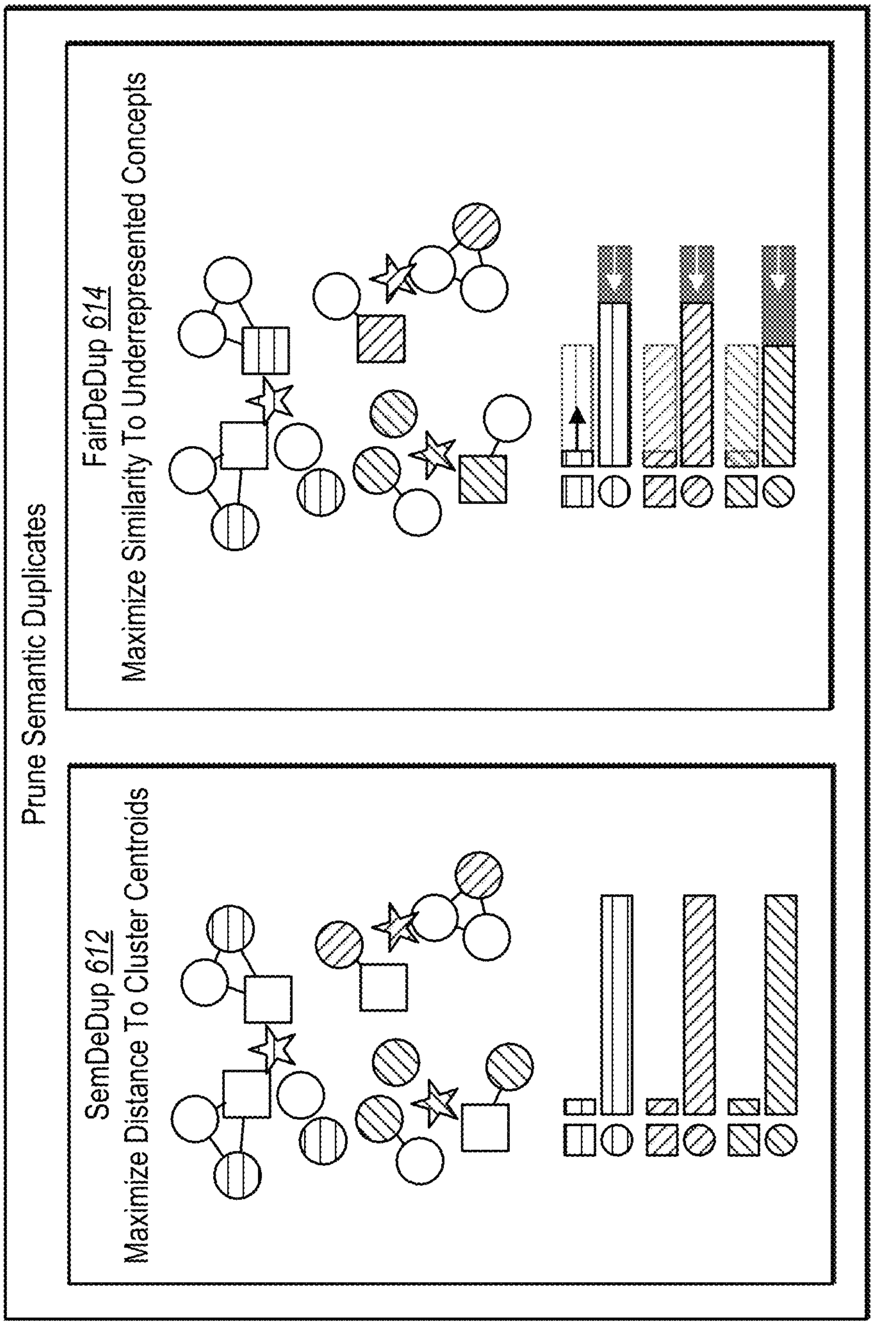
FIG. 6B illustrates an example comparison of pruning training datasets using different deduplication algorithms in accordance with one or more embodiments

In addition to determining the duplicate neighborhoods 608, as discussed above, the fairness deduplication system 102 determines preservable embeddings. In particular, the fairness deduplication system 102 utilizes a fairness deduplication algorithm that differs from prior deduplication techniques, such as that proposed in SemDeDup. FIG. 6B illustrates an example diagram for determining preservable embeddings using a fairness deduplication algorithm (as described in relation to FIG. 5 and in additional detail here) in accordance with one or more embodiments.

FIG. 6B illustrates a comparison between SemDeDup 612 proposed by Amro Abbas et al. and FairDeDup 614, the fairness deduplication algorithm of the fairness deduplication system 102. While both algorithms prune semantic embeddings in an embedding space (and corresponding digital images from a training database), FairDeDup 614 improves the fairness of parameters learned by neural networks as compared to SemDeDup 612 without sacrificing accuracy or quality in generated/predicted outputs. In SemDeDup 612, the process involves a maximum distance selection heuristic. Specifically, SemDeDup 612 preserves semantic embeddings that are farthest from a cluster center. As shown in FIG. 6B, SemDeDup 612 preserves embeddings irrespective of the fairness in representation among the subgroups (or semantic concepts), resulting in a large disparity in preserved samples between the square group and the circle group in each of the three clusters.

In FairDeDup 614, by contrast, the fairness deduplication system 102 preserves preservable embeddings which are most similar (or which satisfy a threshold similarity in relation) to poorly represented semantic concepts. For example, fairness deduplication system 102 selects a preservable embedding for each duplicate neighborhood of a cluster, where the preservable embedding is the embedding that maximizes similarity to the least similar running average preservation prototype. The least similar running average prototype is cluster-specific and is indicated by a preservation prototype whose average similarity score (e.g., cosine similarity, as indicated above) among all semantic embeddings in the cluster is lowest among the preservation prototypes (or corresponds to the least represented semantic concept). As shown in FIG. 6B, the fairness deduplication system 102 thus preserves embeddings based on fairness among the subgroups (or among the semantic concepts), resulting in reduced bias and increased fairness between the square group and the circle group in each of the three clusters.

As noted, the fairness deduplication system 102 determines and tracks a running average similarity between preserved samples in a cluster and each preservation prototype. Until all embeddings are visited, the fairness deduplication system 102 randomly selects an unvisited embedding at each iteration, determines a similarity of all embeddings in its neighborhood to each preservation prototype, and preserves only the embedding that maximizes similarity to the least similar preservation prototype (pruning all others). In some cases, the fairness deduplication system 102 preserves a semantic embedding with a highest average similarity across all (or a set of) preservation prototypes for the first neighborhood visited in a cluster.

The fairness deduplication system 102 determines and tracks running average similarity on a per-cluster basis for at least two reasons. First, the fairness deduplication system 102 avoids a synchronous update step between workers (e.g., processors) processing clusters in parallel. Second, the fairness deduplication system 102 prevents algorithmic gaming of the selection criteria by balancing concept representation on clusters which highly represent a semantic concept due to some stereotyped notion. Given two clusters primarily composed of embeddings extracted from images of doctors and nurses, for example, the fairness deduplication system 102 uses per-cluster processing to prevent balancing under-selection of female doctors by over-selecting female nurses.

In one or more embodiments, the fairness deduplication system 102 implements a fairness deduplication algorithm represented by the following pseudocode:

```
# Input: prototypes, embeddings, eps
# Get similarity with concept prototypes
proto = embeddings @ prototypes.T
balance = AverageMeter(prototype.shape[0])
tovisit = torch.ones(embeddings.shape[0])
while tovisit.any( ):
```

-continued

```
    # Find an unvisited neighborhood
    node = torch.where(tovisit)[0][0]
    sims = embeddings[node] @ embeddings.T
    neighbors = torch.where(sims > 1 − eps) [0]
    # Maximize least represented concept
    c = balance.get_min_concept( )
    point = proto[neighbors][:, c].argmax( )
    balance.update(point)
    log_and_keep(point)
    tovisit[neighbors] = 0
```

As indicated by the pseudocode above, the fairness deduplication system 102 generates preservation prototypes by extracting and combining embeddings from digital images, template strings, or other data. In addition, the fairness deduplication system 102 determines similarities between the preservation prototypes and every image in a dataset. The fairness deduplication system 102 further initializes a running average similarity to track how well each semantic concept is represented (balance=AverageMeter (prototype.shape[0]). Further, the fairness deduplication system 102 executes a while loop that indicates, as long as there are embeddings to visit, the fairness deduplication system 102 selects an embedding, determines similarities to all other points in the cluster to define its duplicate neighborhood, and determines a worst represented preservation prototype. The fairness deduplication system 102 further preserves the embedding in the neighborhood that is most similar to the worst represented preservation prototype and progresses to the next embedding and its neighborhood to repeat the process.

Figure 7:
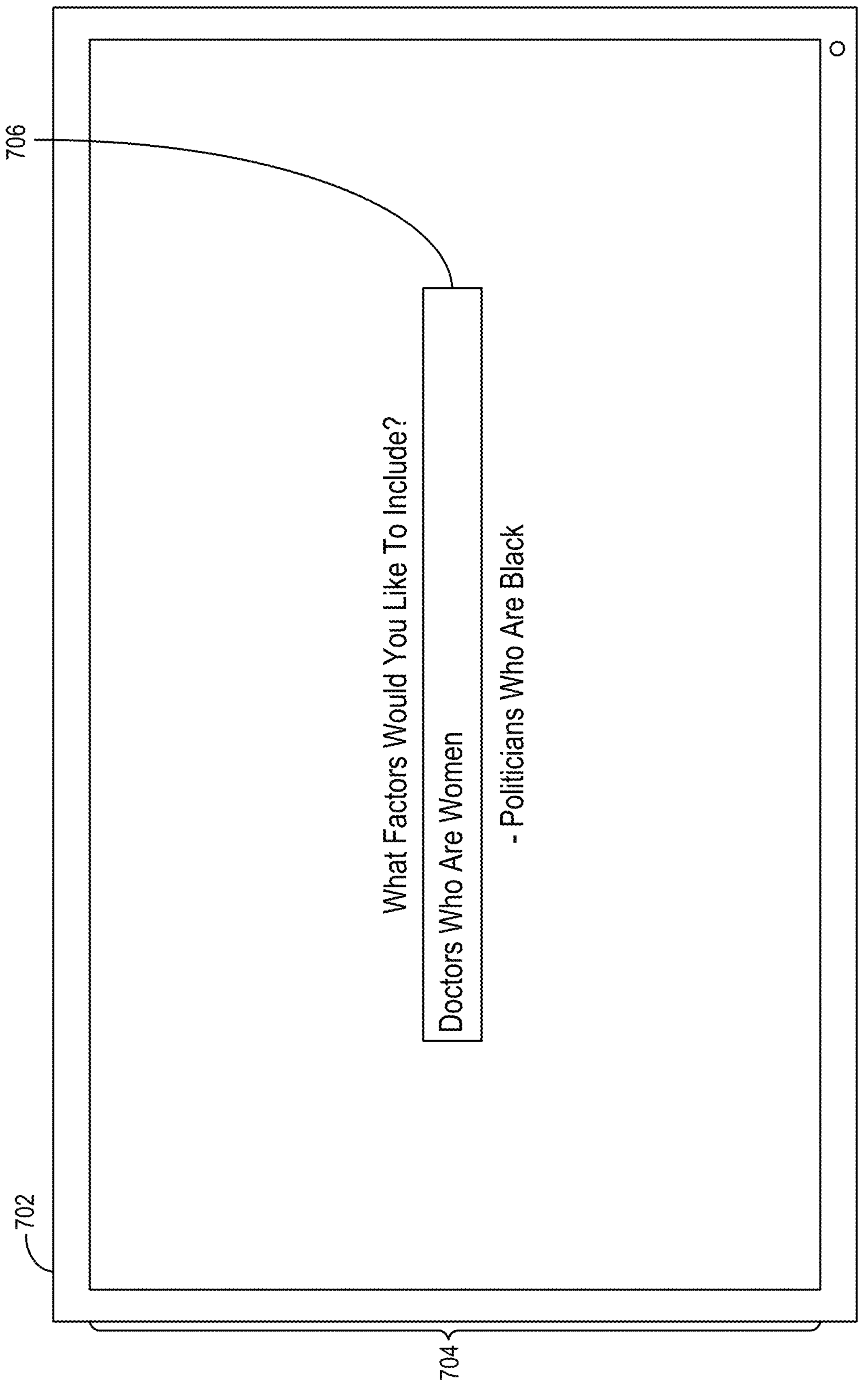
FIG. 7 illustrates an example prototype interface for defining a preservation prototype in accordance with one or more embodiments.

As mentioned above, in certain embodiments, the fairness deduplication system 102 generates preservation prototypes to reduce bias and improve fairness for particular semantic concepts. In particular, the fairness deduplication system 102 generates preservation prototypes based on template strings received from one or more client devices. FIG. 7 illustrates an example interface for defining template strings for a preservation prototype in accordance with one or more embodiments.

As illustrated in FIG. 7, the fairness deduplication system 102 generates and provides a prototype interface 704 for display on a client device 702. Within the prototype interface 704, the fairness deduplication system 102 provides an input element 706 for defining a template string. From the template string, the fairness deduplication system 102 generates a caption and extracts a text embedding representing the semantic concept captured by the caption (and the template string). In some embodiments, the prototype interface 704 includes an element for upload and/or selecting one or more digital images representing semantic concepts to preserve.

In some embodiments, the fairness deduplication system 102 generates a preservation prototype from the input provided via the prototype interface 704. For instance, the fairness deduplication system 102 extracts text embeddings from one or more template strings entered via the input element 706 and/or from one or more selected/uploaded digital images. In addition, the fairness deduplication system 102 combines (e.g., averages) one or more text embeddings to form a preservation prototype for a particular semantic concept. The fairness deduplication system 102 can thus generate multiple preservation prototypes, each of its own respective semantic concept (e.g., where a user provides an input via the prototype interface 704 to define another semantic concept), based on interaction via the prototype interface 704. As shown, the fairness deduplication system 102 generates preservation prototypes for two different semantic concepts: one for "Politicians who are black" and another for "Doctors who are women" to reduce bias for each of these concepts within a training set of digital images.

Figure 8:
FIG. 8 illustrates an example visual comparison of training datasets generating using different deduplication approaches in accordance with one or more embodiments.

As mentioned above, in certain embodiments, the fairness deduplication system 102 results in datasets which provide reduced bias in trained neural network, such as vision-language models. Indeed, experimenters have demonstrated the improvements of the fairness deduplication system 102. FIG. 8 illustrates an example comparison of datasets including training images demonstrating qualitative improvements of the fairness deduplication system 102 in accordance with one or more embodiments.

As illustrated in FIG. 8, both the dataset 802 and the dataset 804 include digital images for training neural networks, such as vision-language models. Specifically, the dataset 802 includes digital images selected or preserved based on a maximum distance selection, such as that of SemDeDup. As shown, the dataset 802 includes images of medical professionals where those depicting doctors are primarily white males and those depicting nurses are primarily white females. By contrast, the dataset 804 includes digital images selected or preserved based on the fairness deduplication algorithm described herein. As shown, the dataset 804 includes images of medical professionals with a mixture of gender and race for images depicting doctors and for images depicting nurses. Indeed, the pruning of the fairness deduplication system 102 results in less bias and fairer representation of underrepresented/protected social groups (or other semantic concepts).

As mentioned above, experimenters have demonstrated qualitative improvements of the fairness deduplication system 102. In particular, experimenters have demonstrated that embodiments of the fairness deduplication system 102 reduce bias and improve fairness in trained neural networks, such as vision-language models. FIG. 9 illustrates an example table of experimental results in accordance with one or more embodiments.

As illustrated in FIG. 9, the table 902 includes experimental results for fairness across different semantic concepts in zero-shot classification. Indeed, the table 902 depicts results for a neural network trained using a complete (unpruned) FACET dataset (as indicated by the "Full" column), for a neural network trained using a FACET dataset pruned 50% using SemDeDup (as indicated by the "SemDeDup" column), and for a neural network trained using a FACET dataset pruned 50% using the fairness deduplication system 102 (as indicated by the "FairDeDup" column). In the experiment, the trained models performed zero-shot classification across 52 person classes. Larger values indicate a greater performance gap between subgroups (e.g., semantic concepts) when predicting true positive samples of the same occupation. Lower values are better for all metrics, and the percentages indicate changes where negative "–" values are reduced bias (improved fairness) and positive "+" values are increased bias (reduced fairness). As shown, the tested embodiment of the fairness deduplication system 102 improves fairness in nearly all metrics across the semantic concepts of gender, skin tone, and age.

As mentioned, the fairness deduplication system 102 improves fairness of neural networks trained using pruned data. Indeed, experimenters have demonstrated how the fairness deduplication system 102 maintains improves fairness relative to other deduplication algorithms, such as SemDeDeup. FIG. 10 illustrates experimental results for comparing representation of underrepresented groups according to one or more embodiments.

As illustrated in FIG. 10, the table 1002 includes data indicating improvement in selection of diverse data representations for one or more embodiments of the fairness deduplication system 102. The experiment involves performing k-means clustering on FACET images with ten different random seeds and applying SemDeDup and FairDeDup to each. The table 1002 shows the percent of the post-pruning dataset labeled as non-majority classes for gender (e.g., feminine, non-binary, other), skin tone (MST>4, other), and age (younger, older, other), averaged across the ten trials. The table 1002 indicates that: 1) SemDeDup does indeed reduce the frequency of the least well represented subgroups, and 2) FairDeDup mitigates this effect. The difference between SemDeDup and FairDeDup is significant at ≥99% confidence (n=10) across all groups according to a paired t-test.

Figure 11:
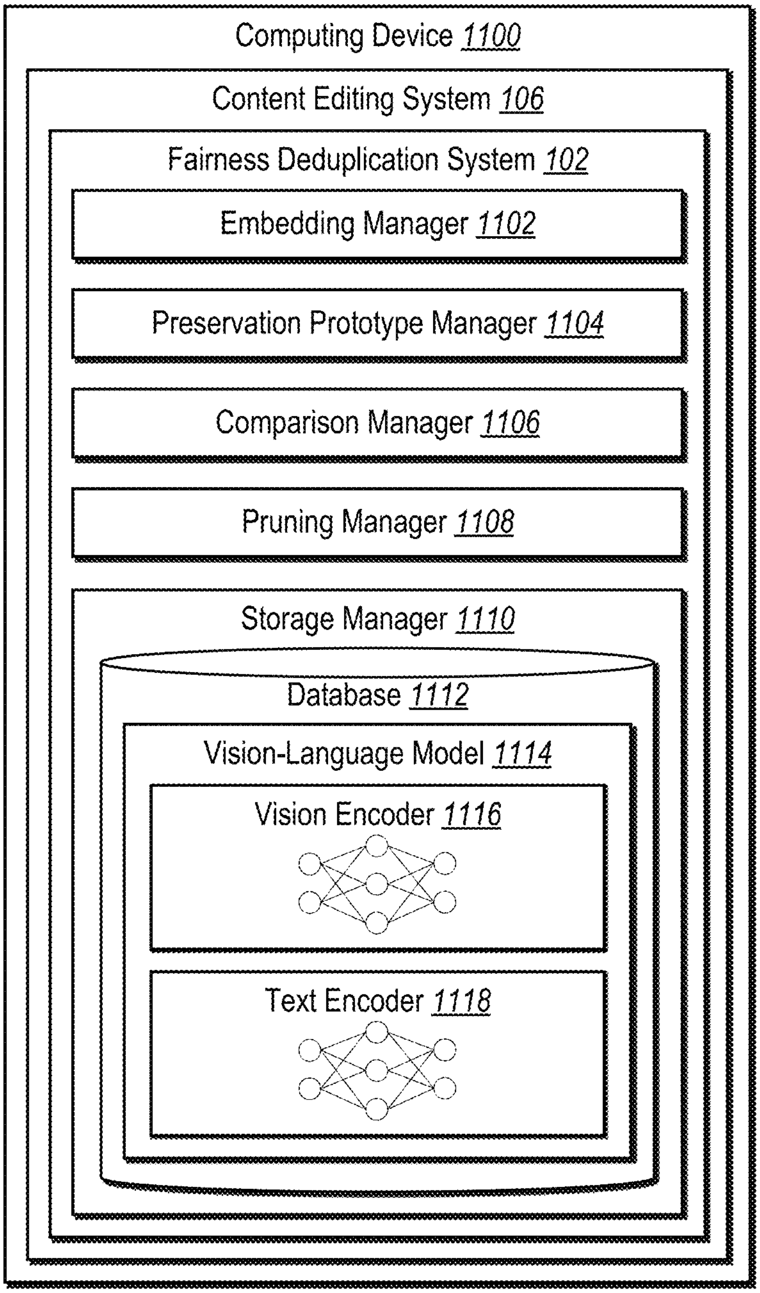
FIG. 11 illustrates a schematic diagram of a fairness deduplication system in accordance with one or more embodiments.

Looking now to FIG. 11, additional detail will be provided regarding components and capabilities of the fairness deduplication system 102. Specifically, FIG. 11 illustrates an example schematic diagram of the fairness deduplication system 102 on an example computing device 1100 (e.g., one or more of the client device 108 and/or the server(s) 104). In some embodiments, the computing device 1100 refers to a distributed computing system where different managers are located on different devices, as described above. As shown in FIG. 11, the fairness deduplication system 102 includes an embedding manager 1102, a preservation prototype manager 1104, a comparison manager 1106, a pruning manager 1108, and a storage manager 1110.

As just mentioned, the fairness deduplication system 102 includes an embedding manager 1102. In particular, the embedding manager 1102 manages, maintains, generates, extracts, determines, embeds, or encodes embeddings within an embedding space. For example, the embedding manager 1102 utilizes one or more encoder neural networks to generate semantic embeddings from digital images. In addition, the embedding manager 1102 utilizes one or more encoder neural networks to generate text embeddings from digital images, captions, and/or template strings for combining into a preservation prototype corresponding to a semantic concept to preserve.

Indeed, as shown, the fairness deduplication system 102 includes a preservation prototype manager 1104. In particular, the preservation prototype manager 1104 manages, maintains, generates, determines, identifies, or selects preservation prototypes. For example, the preservation prototype manager 1104 combines text embeddings extracted from digital images, captions, and/or template strings representing semantic concepts to preserve in a dataset of digital images. In some cases, the preservation prototype manager 1104 averages the text embeddings or performs some other type of combination, such as concatenation, addition, and/or multiplication.

As further shown, the fairness deduplication system 102 includes a comparison manager 1106. In particular, the comparison manager 1106 manages, maintains, determines, performs, applies, or implements a comparison between vectors in an embedding space. For example, the comparison manager 1106 compares semantic embeddings with preservation prototypes by determining distances or cosine similarities between them. In some cases, the comparison manager 1106 further selects sample semantic embeddings, determines neighborhoods for the sample embeddings, and determines similarities for embeddings in the neighborhood relative to preservation prototypes.

Additionally, the fairness deduplication system 102 includes a pruning manager 1108. In particular, the pruning manager 1108 prunes, removes, extracts, or deletes semantic embeddings from an embedding space. For example, the pruning manager 1108 determines a preservable embedding as described herein and preserves the preservable embedding while pruning all other embeddings in the duplicate neighborhood. In some cases, the pruning manager 1108 further preserves the digital image corresponding to the preservable embedding and prunes images (from a database of training images) corresponding to pruned embeddings in the neighborhood (and for other neighborhoods at respective iterations).

The fairness deduplication system 102 further includes a storage manager 1110. The storage manager 1110 operates in conjunction with, or includes, one or more memory devices such as the database 1112 (e.g., the database 114) that store various data such as training digital images, vision-language models, and/or other data. As shown, the database 1112 stores a vision-language model 1114 accessing and usable by other components of the fairness deduplication system 102. The vision-language model 1114 includes a vision encoder 1116 for extracting semantic embeddings from digital images and further includes a text encoder 1118 for extracting text embeddings from captions (to generate preservation prototypes). The storage manager 1110 communicates with the other components of the fairness deduplication system 102 to facilitate the operations and functions described herein.

In one or more embodiments, each of the components of the fairness deduplication system 102 are in communication with one another using any suitable communication technologies. Additionally, the components of the fairness deduplication system 102 is in communication with one or more other devices including one or more client devices described above. It will be recognized that although the components of the fairness deduplication system 102 are shown to be separate in FIG. 11, any of the subcomponents may be combined into fewer components, such as into a single component, or divided into more components as may serve a particular implementation. Furthermore, although the components of FIG. 11 are described in connection with the fairness deduplication system 102, at least some of the components for performing operations in conjunction with the fairness deduplication system 102 described herein may be implemented on other devices within the environment.

The components of the fairness deduplication system 102, in one or more implementations, includes software, hardware, or both. For example, the components of the fairness deduplication system 102 include one or more instructions stored on a computer-readable storage medium and executable by processors of one or more computing devices (e.g., the computing device 1100). When executed by the one or more processors, the computer-executable instructions of the fairness deduplication system 102 cause the computing device 1100 to perform the methods described herein. Alternatively, the components of the fairness deduplication system 102 comprises hardware, such as a special purpose processing device to perform a certain function or group of functions. Additionally, or alternatively, the components of the fairness deduplication system 102 includes a combination of computer-executable instructions and hardware.

Furthermore, the components of the fairness deduplication system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the fairness deduplication system 102 may be implemented as part of a stand-alone application on a personal computing device or a mobile device. Alternatively, or additionally, the components of the fairness deduplication system 102 may be implemented in any application that allows creation and delivery of marketing content to users, including, but not limited to, applications in ADOBE® EXPERIENCE MANAGER and CREATIVE CLOUD®, such as ADOBE® FONTS, PHOTOSHOP®, ILLUSTRATOR®, and INDESIGN®. "ADOBE," "ADOBE EXPERIENCE MANAGER," "CREATIVE CLOUD," "ADOBE FONTS," "PHOTOSHOP," "ILLUSTRATOR," and "INDESIGN" are either registered trademarks or trademarks of Adobe Inc. in the United States and/or other countries.

FIGS. 1-11 the corresponding text, and the examples provide a number of different systems, methods, and non-transitory computer readable media for generating and modifying a database of digital images for training neural networks according to a fairness deduplication algorithm. In addition to the foregoing, embodiments are describable in terms of flowcharts comprising acts for accomplishing a particular result. For example, FIG. 12 illustrates a flowcharts of an example sequences or series of acts in accordance with one or more embodiments.

Figure 12:
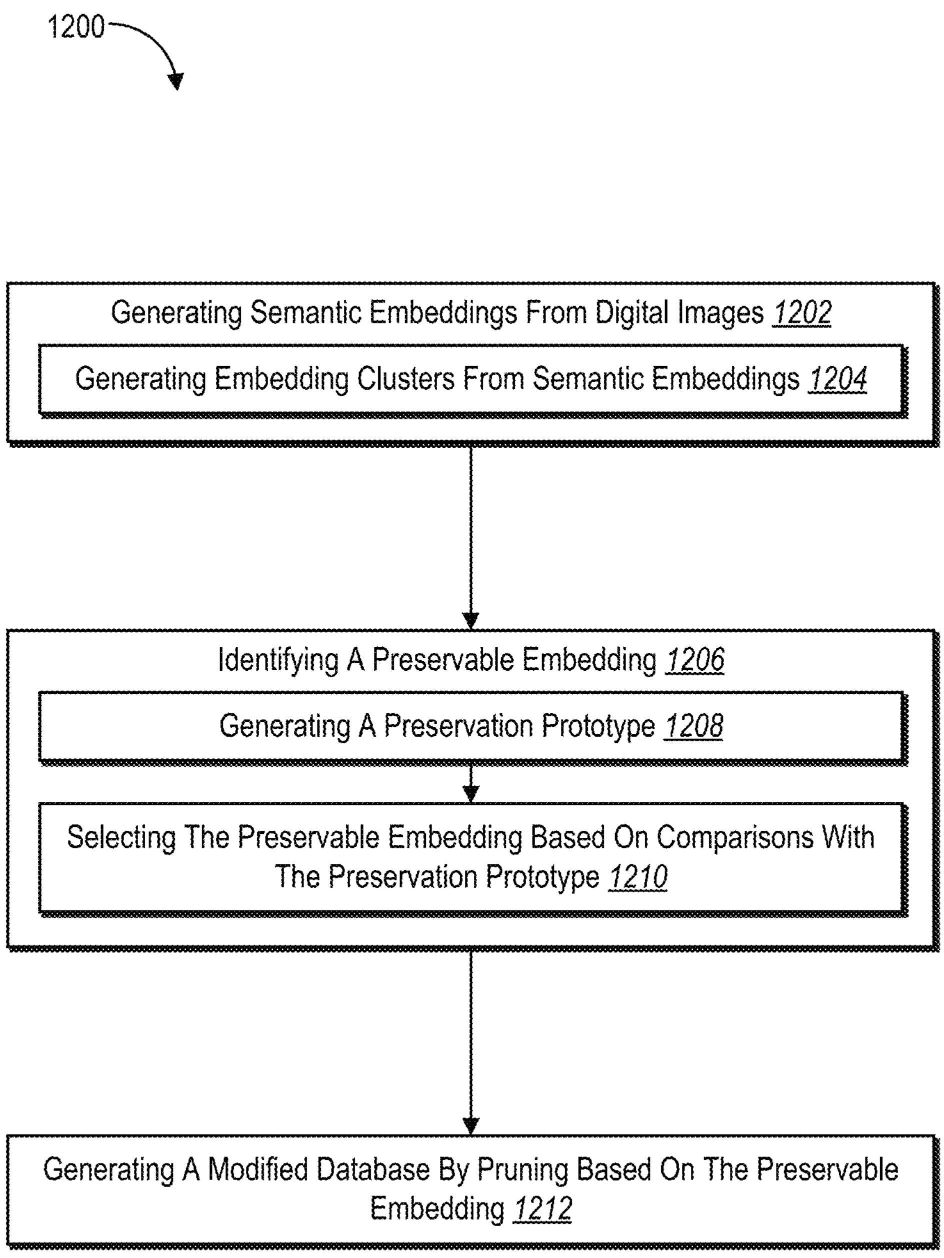
FIG. 12 illustrates a flowchart of a series of acts for generating and modifying databases using a fairness deduplication algorithm in accordance with one or more embodiments.

While FIG. 12 illustrates acts according to particular embodiments, alternative embodiments may omit, add to, reorder, and/or modify any of the acts shown in FIG. 12. The acts of FIG. 12 are be performed as part of a method. Alternatively, a non-transitory computer readable medium comprises instructions, that when executed by one or more processors, cause a computing device to perform the acts of FIG. 12. In still further embodiments, a system performs the acts of FIG. 12. Additionally, the acts described herein may be repeated or performed in parallel with one another or in parallel with different instances of the same or other similar acts.

FIG. 12 illustrates an example series of acts 1200 for generating and modifying a database of digital images for training neural networks according to a fairness deduplication algorithm. In particular, the series of acts 1200 includes an act 1202 of generating semantic embeddings form digital images. For example, the act 1202 involves generating, within an embedding space, semantic embeddings from a plurality of digital images stored in a database. In some embodiments, the act 1202 includes an act 1204 of generating embedding clusters from semantic embeddings. For example, the act 1204 involves generating embedding clusters from the semantic embeddings extracted from the plurality of digital images in an embedding space.

In addition, the series of acts 1200 includes an act 1206 of identifying a preservable embedding. For example, the act 1206 involves identifying, from among the semantic embeddings in the embedding space, a preservable embedding according to a preservation prototype indicating a semantic concept to preserve within the database. In some cases, the act 1206 includes an act 1208 of generating a preservation prototype. For instance, the act 1208 involves generating a preservation prototype from a combination of template strings describing a semantic concept to preserve within the database. In some embodiments, the act 1206 includes an act 1210 of selecting the preservable embedding based on comparisons with the preservation prototype. For example, the act 1210 involves selecting the preservable embedding based on comparing distances from the preservation prototype to the semantic embeddings in the embedding space.

In addition, the series of acts 1200 includes an act 1212 of generating a modified database by pruning based on the preservable embedding. For example, the act 1212 involves generating a modified database by pruning one or more digital images corresponding to semantic embeddings other than the preservable embedding from the database. In some embodiments, the series of acts 1200 includes an act of generating the preservation prototype by: extracting a plurality of text embeddings from captions describing digital images and combining the plurality of text embeddings into the preservation prototype.

In one or more embodiments, the series of acts 1200 includes an act of identifying the preservable embedding by: determining similarity scores between the preservation prototype and the semantic embeddings extracted from the plurality of digital images stored in the database and selecting the preservable embedding based on comparing the similarity scores. In these or other embodiments, the series of acts 1200 includes an act of generating the preservation prototype by combining text embeddings extracted from template strings describing protected demographic groups.

In some embodiments, the series of acts 1200 includes an act of generating embedding clusters from the semantic embeddings extracted from the plurality of digital images in the embedding space and an act of identifying the preservable embedding within an embedding cluster from among the embedding clusters based on comparing distances from the preservation prototype to one or more semantic embeddings within the embedding cluster. In certain embodiments, the series of acts 1200 includes an act of determining, within the embedding space, a duplicate neighborhood defining semantic embeddings within a threshold distance of a sample semantic embedding and an act of selecting the preservable embedding from the duplicate neighborhood as a semantic embedding that satisfies a threshold similarity relative to the preservation prototype.

In one or more embodiments, the series of acts 1200 includes an act of generating the modified database by preserving a digital image corresponding to the preservable embedding for storage within the modified database. In addition, the series of acts 1200 includes an act of updating parameters of a vision-language neural network using the modified database. In some cases, the series of acts 1200 includes acts of generating a plurality of preservation prototypes from combinations of template strings describing semantic concepts to preserve within the database, determining a duplicate neighborhood for a selected semantic embedding from among the semantic embeddings in the embedding space, and identifying the preservable embedding from the duplicate neighborhood by determining a semantic embedding within the duplicate neighborhood that is closest to a least represented preservation prototype from among the plurality of preservation prototypes.

In some embodiments, the series of acts 1200 includes acts of iteratively sampling the semantic embeddings in the embedding space to generate duplicate neighborhoods of one or more semantic embeddings within a threshold distance of a sampled embedding, determining, at each iteration, a preserved embedding for a respective duplicate neighborhood according to similarity relative to one or more preservation prototypes, and generating a running average similarity for the database by iteratively updating similarity scores between iteratively selected preserved embeddings and the one or more preservation prototypes. In these or other embodiments, the series of acts 1200 includes an act of generating the preservation prototype by: receiving, from a client device, a user interaction defining a template string for a preservation factor and combining a text embedding extracted from the template string with one or more additional text embeddings extracted from additional template strings representing the semantic concept to preserve within the database.

In some embodiments, the series of acts 1200 includes an act of generating the preservation prototype by: extracting text embeddings from template strings describing protected demographic groups and combining the text embeddings into the preservation prototype. In certain cases, the series of acts 1200 includes an act of generating the modified database by preserving a digital image corresponding to the preservable embedding for storage within the modified database. In the same or other cases, the series of acts 1200 includes an act of determining, from a repository of digital images, a selected digital image utilizing a vision-language neural network comprising parameters learned from the modified database.

In one or more embodiments, the series of acts 1200 includes an act of generating, within an embedding cluster of the embedding clusters, a set of duplicate neighborhoods corresponding to the semantic embeddings. In some embodiments, the series of acts 1200 includes an act of generating the set of duplicate neighborhoods by: selecting a semantic embedding from among the one or more semantic embeddings in the embedding cluster and designating, as a duplicate neighborhood from among the set of duplicate neighborhoods, a set of semantic embeddings within a threshold similarity of the semantic embedding within the embedding cluster.

In certain embodiments, the series of acts 1200 includes an act of generating the preservation prototype by: extracting a plurality of text embeddings from captions describing digital images and combining the plurality of text embeddings into the preservation prototype. In some cases, the series of acts 1200 includes an act of generating the modified database by preserving a digital image corresponding to the preservable embedding for storage within the modified database.

Embodiments of the present disclosure may comprise or use a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) use transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
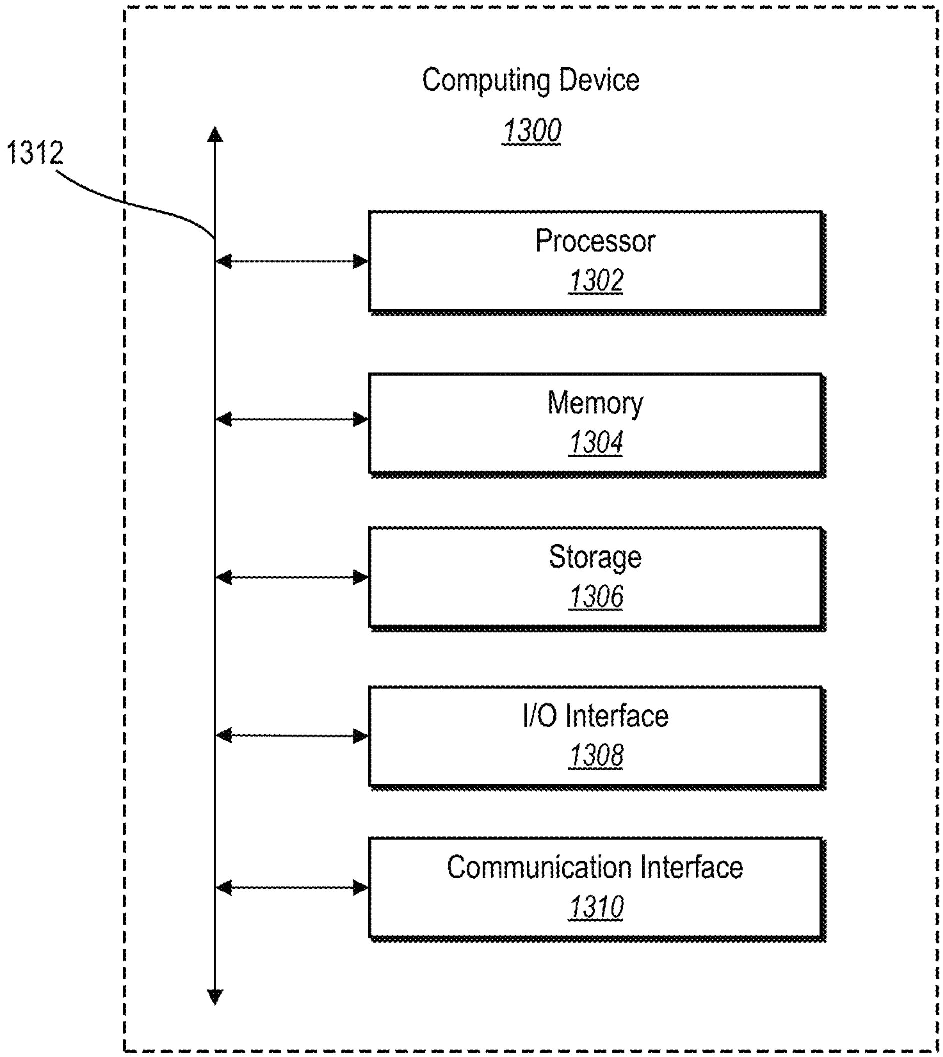
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices, such as the computing device 1300 may represent the computing devices described above (e.g., computing device 1100, server(s) 104, and/or client device 108). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
- generating, within an embedding space, semantic embeddings from a plurality of digital images within a database;
- receiving a user input comprising a text input describing a semantic concept to preserve within the database;
- generating a preservation prototype corresponding to the text input describing the semantic concept to preserve within the database;
- identifying, by comparing the semantic embeddings in the embedding space to the preservation prototype, a preservable embedding within a similarity threshold of the preservation prototype indicating the semantic concept to preserve within the database; and
- generating a modified database by preserving a digital image of the plurality of digital images corresponding to the preservable embedding as representative of the semantic concept corresponding to the preservation prototype and pruning one or more digital images corresponding to additional semantic embeddings other than the preservable embedding from the database.

2. The computer-implemented method of claim 1, further comprising generating the preservation prototype by:
- extracting a plurality of text embeddings from captions describing digital images; and
- combining the plurality of text embeddings into the preservation prototype.

3. The computer-implemented method of claim 1, wherein identifying the preservable embedding comprises:
- determining similarity scores between the preservation prototype and the semantic embeddings extracted from the plurality of digital images within the database; and
- selecting the preservable embedding based on comparing the similarity scores.

4. The computer-implemented method of claim 1, further comprising generating the preservation prototype by combining text embeddings extracted from template strings describing protected demographic groups.

5. The computer-implemented method of claim 1, further comprising:
- generating embedding clusters from the semantic embeddings extracted from the plurality of digital images in the embedding space; and
- identifying the preservable embedding within an embedding cluster from among the embedding clusters based on comparing distances from the preservation prototype to one or more semantic embeddings within the embedding cluster.

6. The computer-implemented method of claim 1, further comprising:
- determining, within the embedding space, a duplicate neighborhood defining semantic embeddings within a threshold distance of a sample semantic embedding; and
- selecting the preservable embedding from the duplicate neighborhood as a semantic embedding that satisfies a threshold similarity relative to the preservation prototype.

7. The computer-implemented method of claim 1, wherein generating the modified database comprises preserving the digital image corresponding to the preservable embedding for storage within the modified database.

8. A non-transitory computer readable medium storing executable instructions which, when executed by a processing device, cause the processing device to perform operations comprising:

generating, within an embedding space, semantic embeddings from a plurality of digital images within a database;

identifying, from among the semantic embeddings in the embedding space, a preservable embedding by:

generating a preservation prototype from a combination of template strings from a user interaction describing a semantic concept to preserve within the database; and selecting the preservable embedding based on comparing distances from the preservation prototype to the semantic embeddings in the embedding space within a similarity threshold; and generating a modified database by preserving a digital image of the plurality of digital images corresponding to the preservable embedding as representative of the semantic concept corresponding to the preservation prototype and pruning one or more digital images corresponding to additional semantic embeddings other than the preservable embedding from the database.

9. The non-transitory computer readable medium of claim 8, wherein the operations further comprise updating parameters of a vision-language neural network using the modified database.

10. The non-transitory computer readable medium of claim 8, wherein the operations further comprise:

generating a plurality of preservation prototypes from combinations of template strings describing semantic concepts to preserve within the database;

determining a duplicate neighborhood for a selected semantic embedding from among the semantic embeddings in the embedding space; and identifying the preservable embedding from the duplicate neighborhood by determining a semantic embedding within the duplicate neighborhood that is within the similarity threshold of a least represented preservation prototype from among the plurality of preservation prototypes.

11. The non-transitory computer readable medium of claim 8, wherein the operations further comprise:

iteratively sampling the semantic embeddings in the embedding space to generate duplicate neighborhoods of one or more semantic embeddings within a threshold distance of a sampled embedding;

determining, at each iteration, a preserved embedding for a respective duplicate neighborhood according to similarity relative to one or more preservation prototypes; and generating a running average similarity for the database by iteratively updating similarity scores between iteratively selected preserved embeddings and the one or more preservation prototypes.

12. The non-transitory computer readable medium of claim 8, wherein the operations further comprise generating the preservation prototype by:

receiving, from a client device, the user interaction defining a template string for a preservation factor; and combining a text embedding extracted from the template string with one or more additional text embeddings extracted from additional template strings representing the semantic concept to preserve within the database.

13. The non-transitory computer readable medium of claim 8, wherein the operations further comprise generating the preservation prototype by:

extracting text embeddings from template strings describing protected demographic groups; and combining the text embeddings into the preservation prototype.

14. The non-transitory computer readable medium of claim 8, wherein generating the modified database comprises preserving a digital image corresponding to the preservable embedding for storage within the modified database.

15. A system comprising:

one or more memory devices; and one or more processors coupled to the one or more memory devices, the one or more processors configured to cause the system to:

extract semantic embeddings from a plurality of digital images within a database;

generate embedding clusters from the semantic embeddings extracted from the plurality of digital images in an embedding space;

receive a user input comprising a text input describing a semantic concept to preserve within the database;

generate a preservation prototype corresponding to the text input describing the semantic concept to preserve within the database;

identify, within an embedding cluster from among the embedding clusters, a preservable embedding based on comparing distances from the preservation prototype to one or more semantic embeddings in the embedding cluster within a similarity threshold; and generate a modified database by preserving a digital image of the plurality of digital images corresponding to the preservable embedding as representative of the semantic concept corresponding to the preservation prototype and pruning one or more digital images corresponding to additional semantic embeddings other than the preservable embedding from the database.

16. The system of claim 15, wherein the one or more processors are further configured to cause the system to determine, from a repository of digital images, a selected digital image utilizing a vision-language neural network comprising parameters learned from the modified database.

17. The system of claim 15, wherein the one or more processors are further configured to cause the system to generate, within an embedding cluster of the embedding clusters, a set of duplicate neighborhoods corresponding to the semantic embeddings.

18. The system of claim 17, wherein the one or more processors are further configured to cause the system to generate the set of duplicate neighborhoods by:

selecting a semantic embedding from among the one or more semantic embeddings in the embedding cluster; and designating, as a duplicate neighborhood from among the set of duplicate neighborhoods, a set of semantic embeddings within a threshold similarity of the semantic embedding within the embedding cluster.

19. The system of claim 15, wherein the one or more processors are further configured to cause the system to generate the preservation prototype by:

extracting a plurality of text embeddings from captions describing digital images; and combining the plurality of text embeddings into the preservation prototype.

20. The system of claim 15, wherein the one or more processors are further configured to cause the system to generate the modified database by preserving the digital image corresponding to the preservable embedding for storage within the modified database.

* * * * *